(12) United States Patent
Kuno

(10) Patent No.: US 7,409,462 B2
(45) Date of Patent: Aug. 5, 2008

(54) PACKET COMMUNICATION CONTROL DEVICE AND PACKET COMMUNICATION CONTROL METHOD

(75) Inventor: Takuma Kuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 739 days.

(21) Appl. No.: 10/886,594

(22) Filed: Jul. 9, 2004

(65) Prior Publication Data

US 2005/0010665 A1  Jan. 13, 2005

(30) Foreign Application Priority Data

Jul. 9, 2003  (JP)  ............... 2003-194155

(51) Int. Cl.
  *G06F 15/16*  (2006.01)
  *G06F 15/173*  (2006.01)
  *G01R 31/08*  (2006.01)

(52) U.S. Cl. ............... 709/245; 709/200; 709/224; 709/229; 370/230

(58) Field of Classification Search ............... 709/200, 709/224, 227, 229, 245; 370/230, 352, 401
See application file for complete search history.

(56) References Cited

U.S. PATENT DOCUMENTS

| | | | | |
|---|---|---|---|---|
| 6,081,524 A * | 6/2000 | Chase et al. | ............... | 370/389 |
| 6,097,719 A * | 8/2000 | Benash et al. | ............... | 370/352 |
| 6,377,990 B1 * | 4/2002 | Slemmer et al. | ............... | 709/225 |
| 6,615,357 B1 * | 9/2003 | Boden et al. | ............... | 726/15 |
| 6,650,631 B1 * | 11/2003 | Benash et al. | ............... | 370/352 |
| 6,717,949 B1 * | 4/2004 | Boden et al. | ............... | 370/401 |
| 6,865,681 B2 * | 3/2005 | Nuutinen | ............... | 726/14 |
| 2002/0059455 A1 | 5/2002 | Taijiri et al. | | |
| 2003/0110292 A1 | 6/2003 | Takeda et al. | | |

(Continued)

FOREIGN PATENT DOCUMENTS

JP    A 11-69008    3/1999

(Continued)

OTHER PUBLICATIONS

"iTelevolution: Various Communications are Possible Using VoIP Based on a Soft Switch", NetworkWorld, vol. 8., No. 8, (entitled and published by IDG Japan, Inc., on Jun. 24, 2003, Japan) pp. 198-199.

*Primary Examiner*—Ario Etienne
*Assistant Examiner*—El Hadji M Sall
(74) *Attorney, Agent, or Firm*—Oliff & Berridge, PLC

(57) ABSTRACT

A packet transmission control device includes a socket detecting system that detects addresses and ports of a first device and a second device, which perform a packet communication in a network by transmitting/receiving data packets, a socket storing system that stores addresses and ports detected by the socket detecting system, a session information detecting system that detects session information regarding the packet communication according to a communication protocol of the packet communication between the first device and the second device, a session information storing system that stores the session information detected by the session information detecting system, a terminal capability detecting system that detects terminal capability of each of the first device and the second device prior to the packet communication according to the communication protocol, and a terminal capability storing system that stores the terminal capabilities detected by the terminal capability detecting system.

23 Claims, 24 Drawing Sheets

U.S. PATENT DOCUMENTS

| | | | |
|---|---|---|---|
| 2004/0086093 A1* | 5/2004 | Schranz | 379/37 |
| 2007/0127650 A1* | 6/2007 | Altberg et al. | 379/114.13 |

FOREIGN PATENT DOCUMENTS

| | | |
|---|---|---|
| JP | A-11-220487 | 8/1999 |
| JP | A 2001-156852 | 6/2001 |
| JP | A 2001-223747 | 8/2001 |
| JP | A 2001-345933 | 12/2001 |
| JP | A 2002-152260 | 5/2002 |
| JP | A-2003-087396 | 3/2003 |
| JP | A-2003-163690 | 6/2003 |
| JP | A-2003-174466 | 6/2003 |

* cited by examiner

FIG. 14

| | Octet #0 | | | | | | | | Octet #1 | | | | | | | | Octet #2 | | | | | | | | Octet #3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | 0x00 | | | | | | | | Logical Channel Number | | | | | | | | | | | | | | | | 0 | 0 | 0 | 0 | 0 | 1 | 1 | X |
| 4 | AuType | | | | 0 | 0 | 0 | 0 | #samples | | | | | | | | 0x80 | | | | | | | | length=0x0A | | | | | | | |
| 8 | 0x04 | | | | | | | | 0x00 | | | | | | | | session id | | | | | | | | 0 | M | 0 | 0 | 0 | 0 | 0 | 0 |
| 12 | RTCP:IP address | | | | | | | | | | | | | | | | | | | | | | | | | | | | | | | |
| 16 | RTCP:UDP port number | | | | | | | | | | | | | | | | | | | | | | | | | | | | | | | |

FIG.15

| |
|---|
| S=(session name) |
| i=*(session information) |
| u=*(URI of description) |
| e=*(email address) |
| p=*(phone number) |
| c=*(connection information − not required if included in all media) |
| b=*(bandwidth information) |
| z=*(time zone adjustments) |
| k=*(encryption key) |
| a=*(zero or more session attribute lines) |
| t=*(time the session is active) |
| r=*(zero or more repeat times) |
| m=*(media name and transport address) |
| i=*(media title) |
| c=*(connection information − optional if included at session level) |
| b=*(bandwidth information) |
| k=*(encryption key) |
| a=*(zero or more media attribute lines) |

PORT NUMBER OF ROUTER FOR HOOKING UDP 49152
PORT NUMBER OF EP1: 41952 OR GREATER (ARBITRARY)

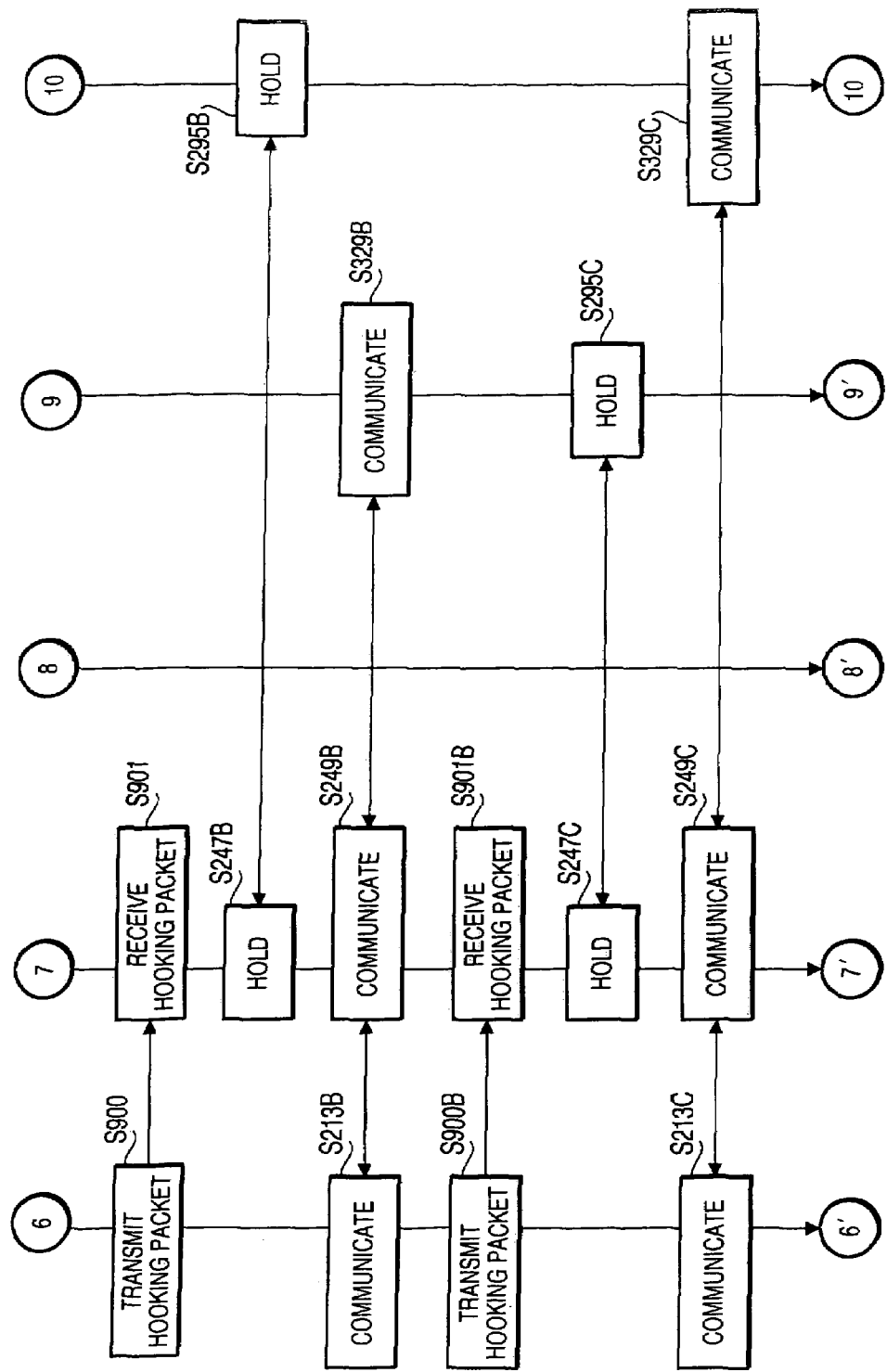

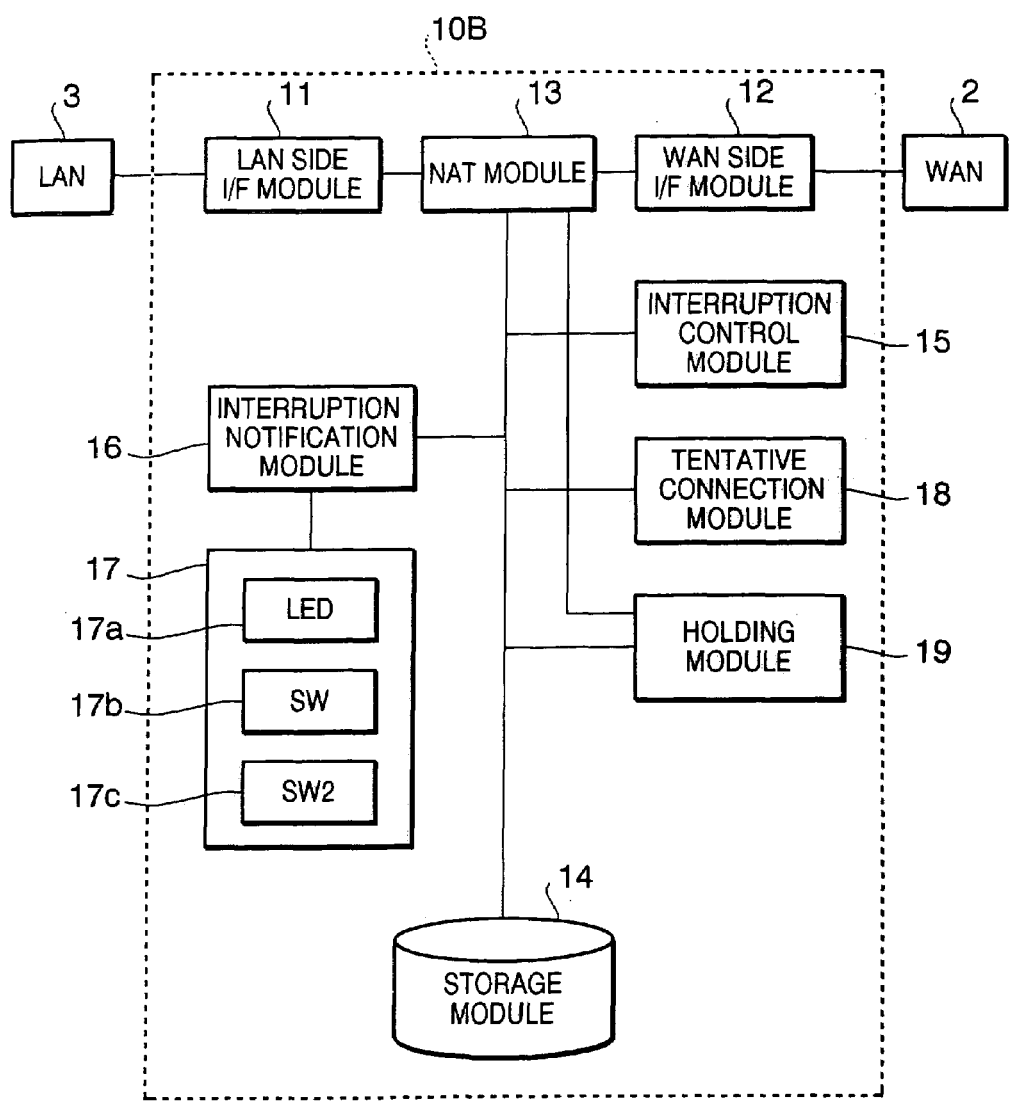

PACKET COMMUNICATION CONTROL DEVICE AND PACKET COMMUNICATION CONTROL METHOD

BACKGROUND OF THE INVENTION

The present invention relates to a packet communication control device and method for a network where data is transmitted in the form of packet.

In a field of the packet communication in which information is transmitted/received in unit called packet, the quantity of information transmitted/received through the network is getting larger in association with the well-developed communication infrastructures such as a LAN (Local Area Network) and the Internet, and with the enhancement of various communication terminals dedicated to such a network. In particular, in an application of voice communication, an IP (Internet Protocol) telephone system, which enables the vice communication with the packet transmission/reception gathers attentions. An existing PSTN (Public Switched Telephone Network) system uses its dedicated exchanger system, and a fixed connected condition should be taken over between two communication terminals, which requires running cost therefor. In a network system using the packet communication, all the terminals on the network can share the common cable and therefore general purpose network apparatuses can be used for communication therebetween, which provides a low-running-cost communication system.

The Internet Protocol (IP) which is a mainstream protocol for the packet communication system transmits/receives packets each including a header portion and a payload (information) portion. The header portion contains information necessary for transmitting/receiving the packets. For example, the header contains IP addresses and port numbers of the sending end and destination (i.e., a receiving end). The payload portion contains the information to be transmitted/received. The IP addresses are assigned to respective terminal apparatuses, which includes local addresses which are unique for respective apparatus (i.e., one for each apparatus) inside the LAN, and global addresses which are unique for apparatuses within the upper networks such as the Internet. The ports allow the packets to be transmitted from or received by applications implemented in the apparatuses.

In order to exchange the packets among the apparatuses belonging to different addressing systems such as a case where the packets are exchange between the local addressing system and global addressing system as described above, conversion of the IP addresses and the ports should be performed.

FIG. 11 is a diagram for illustrating a network system 100 employing a conventional data conversion for exchange data among the network systems having different addressing systems. The network system 100 includes a LAN 111, a network 112, a router 101, terminals 113 and 114. The LAN 111 is a network in which data packets are transmitted/received in accordance with the IP, and the local addressing system is employed. The network 112 is a network, which is an upper network with respect to the LAN 111. In the network 112, data packets are transmitted/received in accordance with the IP and the global addressing system is employed. The router 101 has a function of controlling transmission/reception of data packets between the networks having different addressing systems. As shown in FIG. 11, the router 101 is connected to the networks 111 and 112. The terminals 113 and 114 transmit data packet in accordance with the IP. The terminal 113 is connected to the LAN 111, while the terminal 114 is connected to the network 112. In the example shown in FIG. 11, it is assumed that the IP address of the terminal 113 is a "local address A", the IP address of the router 101 is a "global address B", and the IP address of the terminal 114 is a "global address C".

Between the terminals 113 and 114, due to the difference of the employed addressing systems, it is impossible for each terminal to transmit/receive data packets only by designating the IP address of the other. In order for allowing the data exchange between the terminals of the LAN 111 and the network 112, a so-called IP masquerade function is utilized. Specifically, when a data packet is transmitted from the terminal 113 to the terminal 114, a packet of which the sending apparatus's IP address (i.e., A) and the port used in the terminal 113, the receiving apparatus' IP address (i.e., C) and the port used in the terminal 114 are written in the header is transmitted to the router 101. The router 101, where receives the packet transmitted from the terminal 113, converts the IP address A of the sending apparatus and the port used in terminal device 113 written in the header of the packet are converted into the global address B of the router 101 and the port assigned thereto. The packet of which the IP address and the port are converted is transmitted from the router 101 to the terminal 114. The terminal 114, which receives the packet transmitted from the router 101, refers to the header of the received packet, and transmits a packet, in which the sending apparatus's IP address C, the port used in the terminal 114, the receiving apparatus's IP address and the assigned port are written to the router 101. The router 101 which receives the packet transmitted from the terminal 114 converts the receiving apparatus's IP address C and port as assigned which are written in the header of the packet into the IP address A and the port used in the terminal 113. The packet of which the IP address of the receiving apparatus and the port are converted is transmitted from the router 101 to the terminal 113.

In the VoIP (Voice over Internet Protocol) used for the IP telephone, the IP addresses and the ports of the sending/receiving apparatuses are written not only in the header but also in the payload. However, according to the IP masquerade function as implemented in the router 101, which only converts the data in the header of the packet, the converted packet includes different IP addresses in the header and the payload. In such a case, the received terminal cannot process the received packet. Further, even if the receiving apparatus can process the received packet, a newly created packet created by the receiving apparatus cannot be converted by the router 101. In view of such a configuration, some methods for converting the addresses not only in the header but also in the payload have been suggested. Examples of such methods are disclosed in Japanese Patent Provisional Publications No. P2002-152260A and No. P2001-156852A.

FIG. 12 shows a conventional voice communication system 200 in accordance with ITU-T Recommendation H.323, which is a typical VoIP. As shown in FIG. 12, the voice communication system 200 includes a LAN 211, a network 212, a router 201, terminals 213 and 214, and a gate keeper 215.

The LAN 211 is a network in which packets are transmitted/received in accordance with the IP. The LAN 211 employs the local addressing system. The network 212 is the upper network with respect to the LAN 211, in which packets are transmitted/received in accordance with the IP. The network 212 employs the global addressing system. The router 201 is for controlling transmission/reception of packets between network systems employing different addressing systems. The router 201 is connected to the LAN 211 and the network 212. The terminals 213 and 214 are IP telephones allowing the voice communication in accordance with H. 323. The terminal 213 is connected to the LAN 211, and the terminal 214 is connected to the network 212. The gate keeper 215 is a server, which functions to convert telephone numbers and IP addresses in accordance with H. 323, and authentication in accordance with H. 323. The gate keeper 215 is connected to the network 212.

The router 201 includes an NAT (Network Address Translation) unit, 202, a storage unit 203, a LAN side interface 204, and a WAN side interface 205. The NAT unit 202 converts the address and port written in the header and payload of a packet based on predetermined data stored in the storage 203. The storage 203 stores a correspondence table containing the IP address and port for the NAT of the EP (End Point) 1, the corresponding IP address and port of EP 2, and converted address and port.

It should be noted that EP referred to above is a common name for a terminal: EP 1 represents the terminal device 213, and EP 2 represents the terminal device 214.

The IP address and port for the NAT of the EP 1 are those for converting the IP address of the packet transmitted by the EP1 into the IP address and the port in accordance with the global addressing system. The IP address is the global IP address assigned to the router 201 itself, and the port is a port assigned in each case. The IP address and port of the EP 2 are the global address and port of the EP 2. The correspondence table stores the relationship of IP addresses and ports before and after the conversion by the NAT unit 202. The LAN side interface 204 interfaces the connection with the LAN 211. The WAN interface 205 interfaces the connection with respect to the network 212.

FIG. 13 is a sequence chart illustrating operation of the voice communication system 200. In FIG. 13, a case where a communication with the terminal 214 (EP 2) is requested by the terminal 213 (EP 1). The router 201 only converts the IP addresses and ports of the packets transmitted from the terminal 213, and those received by the terminal 213, and detailed description is omitted for the sake of brevity.

Firstly, the terminal 213 transmits an ARQ (Admission Request) to the gate keeper 216 (S601). The ARQ is a request for admission according to H.323. The gate keeper 215, which has received the ARQ from the terminal 213, transmits an ACF (Admission Confirm) to the terminal 213 (S621). The ACF is an admission confirmation, and the gate keeper 215 also transmits the IP address of the terminal 214. When the ACF is received from the gate keeper 215, the terminal 213 starts opening a channel open according to the TCP (Transmission Control Protocol) with respect to the terminal 214 based on the received IP address of the terminal 214 (S603, S641).

When the channel open for the TCP has been finished, the terminal 213 transmits a Setup, which is a forward message attempting to connect an H.323 entity of the terminal 213 itself with an H.323 entity of the terminal 214 (S605). For transmitting the message, port 1720 which is used in H.225 that is compliant with H.323. The terminal device 214, which has received the Setup from the terminal 213, transmits, to the terminal 213, a "CallProceeding" that is a backward message notifying that the call proceeding is started (S643). Then, the terminal 214 transmits the ARQ to the gate keeper 215 (S645). The gate keeper 215 that receives a request for admission from the terminal 214 transmits the ACF to the terminal device 214 (S623). The terminal 214, which has received the admission confirm from the gate keeper 215, ringers a bell, and transmits an Alerting to the terminal 213 (S647). Further, when the terminal 214 responds, a Connect is transmitted to the terminal 213 to notify that the terminal responds (S649).

The terminal 213, which has received the Connect transmitted by the terminal 214, starts a channel open proceeding according to H.245 in order to establish connection between entities of the terminals 213 and 214 (S607, S651). During the channel open proceeding according to H.245, data is exchanged between the terminals 213 and 214, and "AuType", which is a data compression method used for data communication, and other parameters for communication are determined. It should be noted that "AuType" is transmitted through "OpenLogicalChannel". When the channel open proceeding according to H.245 has been finished, a voice communication according to H.323 is executed between the terminals 213 and 214 (S609, S653). When the voice communication between the terminals 213 and 214 is finished, an end proceeding according to H.245 is-performed between the terminals 213 and 214 (S611, S655). When the end proceeding has been finished between the terminals 213 and 214, the terminal 213 transmits a "ReleaseComplete" to the terminal 214 to notify that the connection with the terminal 214 will be released (S613). Thereafter, the terminal 213 transmits DRQ (Disengage Request) to the gate keeper 215 (S615). The DRQ is an end notification according to H.323 with respect to the gate keeper 215. The gate keeper 215, which has received the DRQ transmitted from the terminal 213, transmits a DCF (Disengage Confirm) to the terminal 213 (S625). The DCF is a notification, which is transmitted from the gate keeper 215, for confirming the end of the communication according to H.323. When the terminal 214 has received the "ReleaseComplete" transmitted from the terminal 213, the terminal 214 transmits the DRQ to the gate keeper 215 (S657). Similarly, the gate keeper 215, which has received the DRQ from the terminal 214, outputs the DCF to the terminal device 214. With above procedure, the gate keeper 215 finished the end proceeding of the communication between the terminals 213 and 214 (S627).

As above, when the "VoIp" is used, by changing the payload as well as the header, the voice communication using the packet transmission can be realized even between the terminals employing different addressing systems.

According to H.323, when two terminals are performing the communication, the ports (1720) managing the call control are occupied, and the channel open according to H.245 with respect to the port cannot be performed. Thus, it is impossible for a third terminal to interrupt the communication between two terminals and to communicate with one of the two terminals. Even if another port is opened and the H.245 channel open is performed, a terminal capability of the destination determined by the channel open according to H.245 is unknown, and therefore, "AuType" cannot be determined. As above, the "VoIP" such as H.323 is configured to handle a communication between two terminals, and a case where a third terminal interrupts to communicate one of the two terminals is not assumed. Therefore, according to the conventional communication system, it is impossible to allow the third terminal to communicate with one of the two terminals which have been communicating.

SUMMARY OF THE INVENTION

The present invention is advantageous in that, when two terminals are performing a communication in accordance with the communication procedure using the data packets, a third terminal is allowed to communicate with one of the two terminals performing the communication.

According to an aspect of the invention, there is provided a packet transmission control device, which includes a socket detecting system that detects addresses and ports of a first device and a second device, which perform a packet communication in a network by transmitting/receiving data packets, a socket storing system that stores addresses and ports detected by the socket detecting system, a session information detecting system that detects session information regarding the packet communication according to a communication protocol of the packet communication between the first device and the second device, a session information storing system that stores the session information detected by the session information detecting system, a terminal capability detecting system that detects terminal capability of each of the first device and the second device prior to the packet communication according to the communication protocol, and a terminal capability storing system that stores the terminal capabilities detected by the terminal capability detecting system.

When the packet transmission control device is configured as above, it becomes possible that a third device, which is not currently connected to the first or second device, refers to the communication protocol, the session information and the terminal capabilities.

Optionally, the packet transmission control device may be further provided with a tentative connection system that executes a connecting proceeding with a third device when the first device and the second device is executing the packet communication according to the communication protocol, the connecting proceeding with the third device being performed according to the communication protocol, the session information stored in the session information storing system and the terminal capabilities stored in the terminal capability storing system, and an interruption system that realize a communication between the first device and the third device by transferring a packet, which is transmitted by the third device toward the tentative connection system, to the first device, and a packet, which is transmitted by the first device toward the second device, to the third device, in accordance with the addresses and ports stored in the socket storing system.

Further optionally, the tentative connection system may execute an end proceeding of the communication when the communication between the first device and the third device is to be terminated.

Still further, the interruption system may convert the addresses and ports of a destination, which are included in the packet transmitted from the first device toward the second device into addresses and ports for the third device, and addresses and ports of a destination, which are included in the packet transmitted from the third device toward the tentative connection system to the addresses and ports for the first device.

In this case, the packet may optionally include a header section and an information section (i.e., payload), the interruption system converting the addresses and ports included in both the header section and information section.

Optionally, the packet transmission control device may further include a holding system that applies a terminating proceeding to a packet which is transmitted by the second device toward the first device without transmitting to the first device, the holding system stopping the terminating proceeding so that transmission of packets from the second device to the first device is re-executed when the communication between the first device and the third device is terminated.

In this case, the holding system may optionally be configured to transmit packets containing predetermined information to the second device when the terminating proceeding is applied to the packet transmitted by the second device.

In a particular case, when a predetermined operation is executed, the holding system may stop the terminating proceeding applied to the packets transmitted by the second device, the holding system applying the terminating proceeding to packets which are transmitted by the third device toward the first device without transmitting to the first device, the holding system stopping the terminating proceeding so that transmission of packets from the second device to the first device is re-executed when the communication between the first device and the third device is terminated.

The predetermined operation may include an operation of an operable member provided to the first device.

Further optionally, the packet transmission control device may include an interruption detecting system that detects a request of the third device for a communication with the first device, an interruption notifying system that notifies the request for the communication detected by the interruption detecting system, and an admission detecting system that detects that a user of the first device accepted the request for the communication transmitted by the interruption notifying system. In this case, the interruption system may realize the communication between the first device and the second device when the admission detecting system detects that the user of the first device accepted the request for the communication.

Further, the interruption notifying system may be configured to transmit a packet containing a notification to the first device.

Furthermore, the interruption notifying system may notify using a display which is recognizable by the user of the first device.

Optionally, the admission detecting system may detect admission information that is included in a packet transmitted by the first device.

Alternatively or optionally, the admission detecting system may detect an output of a user operable switch provided to the first device, the user operable switch being operated by the user when the request for the communication is accepted.

Further optionally, the first device may be connected to one of a plurality of sub-networks which are connected in parallel or hierarchically to form a network, and the second device and the third device may be connected to another one of the plurality of sub-networks.

In a particular case, the packet transmission control device may be implemented in a router that relays the packet communication between devices connected to one of the plurality of sub-networks and another one of the plurality of sub-networks.

Further optionally, addresses of the first device and the tentative connection device are local addresses in one of the sub-network, and the interruption system may include a converting system that converts the destination addresses and ports included in the packets transmitted by the first device and the tentative connection device into global addresses and ports in the network, and the destination addresses and ports included in the packets transmitted toward the first device and the tentative connection device into local addresses and ports in the one of the sub-networks.

Still optionally, the packet may be transmitted in accordance with the Internet Protocol.

Optionally, the communication protocol is one of H.323 and SIP (Session Initiation Protocol), and the terminal capability is Open Logical Channel when the communication protocol is H.323, and INVITE when the communication protocol is the SIP.

In a particular case, each of the first device, second device and the third device has a function of an IP telephone.

According to another aspect of the invention, there is provided a method for controlling a packet transmission, which includes a socket detecting step that detects addresses and ports of a first device and a second device, which perform a packet communication in a network by transmitting/receiving data packets, a socket storing step that stores addresses and ports detected in the socket detecting step, a session information detecting step that detects session information regarding the packet communication according to a communication protocol of the packet communication between the first device and the second device, a session information storing step that stores the session information detected in the session information detecting step, a terminal capability detecting step that detects terminal capability of each of the first device and the second device prior to the packet communication according to the communication protocol, a terminal capability storing step that stores the terminal capabilities detected in the terminal capability detecting step, a tentative connection step that executes a connecting proceeding between a tentative connection device and a third device when the first device and the second device is executing the packet communication according to the communication protocol, the connecting proceeding with the third device being performed according to the communication protocol, the session information stored in the session information storing step and the terminal capabilities stored in the terminal capability storing step, an interruption step that realizes a communication between the first device and the third device by transferring a packet, which is transmitted by the third device toward the tentative connection device, to the first device, and a packet, which is transmitted by the first device toward the second device, to the third device, in accordance with the addresses and ports stored in the socket storing step, and a recovering step that recovers the communication between the first device and the second device by changing back a destination of the packet transmitted from the first device toward the second device to the second device when the communication between the first device and the second device is terminated.

According to a further aspect of the invention, there is provided a method for controlling a packet transmission, which is provided with a socket detecting step that detects addresses and ports of a first device and a second device, which perform a packet communication in a network by transmitting/receiving data packets, a socket storing step that stores addresses and ports detected in the socket detecting step, a session information detecting step that detects session information regarding the packet communication according to a communication protocol of the packet communication between the first device and the second device, a session information storing step that stores the session information detected in the session information detecting step, a terminal capability detecting step that detects terminal capability of each of the first device and the second device prior to the packet communication according to the communication protocol, a terminal capability storing step that stores the terminal capabilities detected in the terminal capability detecting step, a tentative connection step that executes a connecting proceeding between a tentative connection device and a third device when the first device and the second device is executing the packet communication according to the communication protocol, the connecting proceeding with the third device being performed according to the communication protocol the session information stored in the session information storing step and the terminal capabilities stored in the terminal capability storing step, an interruption step that realizes a communication between the first device and the third device by transferring a packet, which is transmitted by the third device toward the tentative connection device, to the first device, and a packet, which is transmitted by the first device toward the second device, to the third device, in accordance with the addresses and ports stored in the socket storing step, and a recovering step that recovers the communication between the first device and the second device by changing back a destination of the packet transmitted from the first device toward the second device to the second device with holding the communication with the third device by transferring a packet., which is transmitted by the third device toward the first device to the tentative connection device, and by transferring a packet, which is transmitted by the first device toward the tentative connection device, to the second device, in accordance with the addresses and ports stored in the socket storing step.

According to a furthermore aspect of the invention, there is provided a computer program product comprising computer readable instructions that cause a computer to detect addresses and ports of a first device and a second device, which perform a packet communication in a network by transmitting/receiving data packets, to store addresses and ports as detected, to detect session information regarding the packet communication according to a communication protocol of the packet communication between the first device and the second device, to store the session information as detected, to detect terminal capability of each of the first device and the second device prior to the packet communication according to the communication protocol, to store the terminal capabilities as detected, to execute a connecting proceeding between a tentative connection device and a third device when the first device and the second device are executing the packet communication according to the communication protocol, the connecting proceeding with the third device being performed according to the communication protocol, the session information as stored and the terminal capabilities as stored, to realize a communication between the first device and the third device by transferring a packet, which is transmitted by the third device toward the tentative connection device, to the first device, and a packet, which is transmitted by the first device toward the second device, to the third device, in accordance with the addresses and ports as stored, and to recover the communication between the first device and the second device by changing back a destination of the packet transmitted from the first device toward the second device to the second device when the communication between the first device and the second device is terminated.

According to another aspect of the invention, there is provided a computer program product comprising computer readable instructions that cause a computer to detect and store addresses and ports of a first device and a second device, which perform a packet communication in a network by transmitting/receiving data packets, detect and store session information regarding the packet communication according to a communication protocol of the packet communication between the first device and the second device, detect and store terminal capability of each of the first device and the second device prior to the packet communication according to the communication protocol, execute a connecting proceeding between a tentative connection device and a third device when the first device and the second device is executing the packet communication according to the communication protocol, the connecting proceeding with the third device being performed according to the communication protocol, the session information as stored and the terminal capabilities as stored, realize a communication between the first device and the third device by transferring a packet, which is transmitted by the third device toward the tentative connection device, to the first device, and a packet, which is transmitted by the first device toward the second device, to the third device, in accordance with the addresses and ports as stored, and recover the communication between the first device and the second device by changing back a destination of the packet transmitted from the first device toward the second device to the second device with holding the communication with the third device by transferring a packet, which is transmitted by the third device toward the first device to the tentative connection device, and by transferring a packet, which is transmitted by the first device toward the tentative connection device, to the second device, in accordance with the addresses and ports as stored.

BRIEF DESCRIPTION OF THE DRAWINGS

FIG. 14 shows an example of data "OpenLogicalChannel";

FIG. 15 shows an "INVITE" which is used when the communication protocol is SIP;

FIG. 21 shows a part of an operational sequence of the network system according to the second embodiment

FIG. 23 shows a functional configuration of the router according to the third embodiment.

DETAILED DESCRIPTION OF THE EMBODIMENTS

Referring the accompanying drawings, embodiments of the invention employing the H.323 will be described.

First Embodiment

Figure 1:
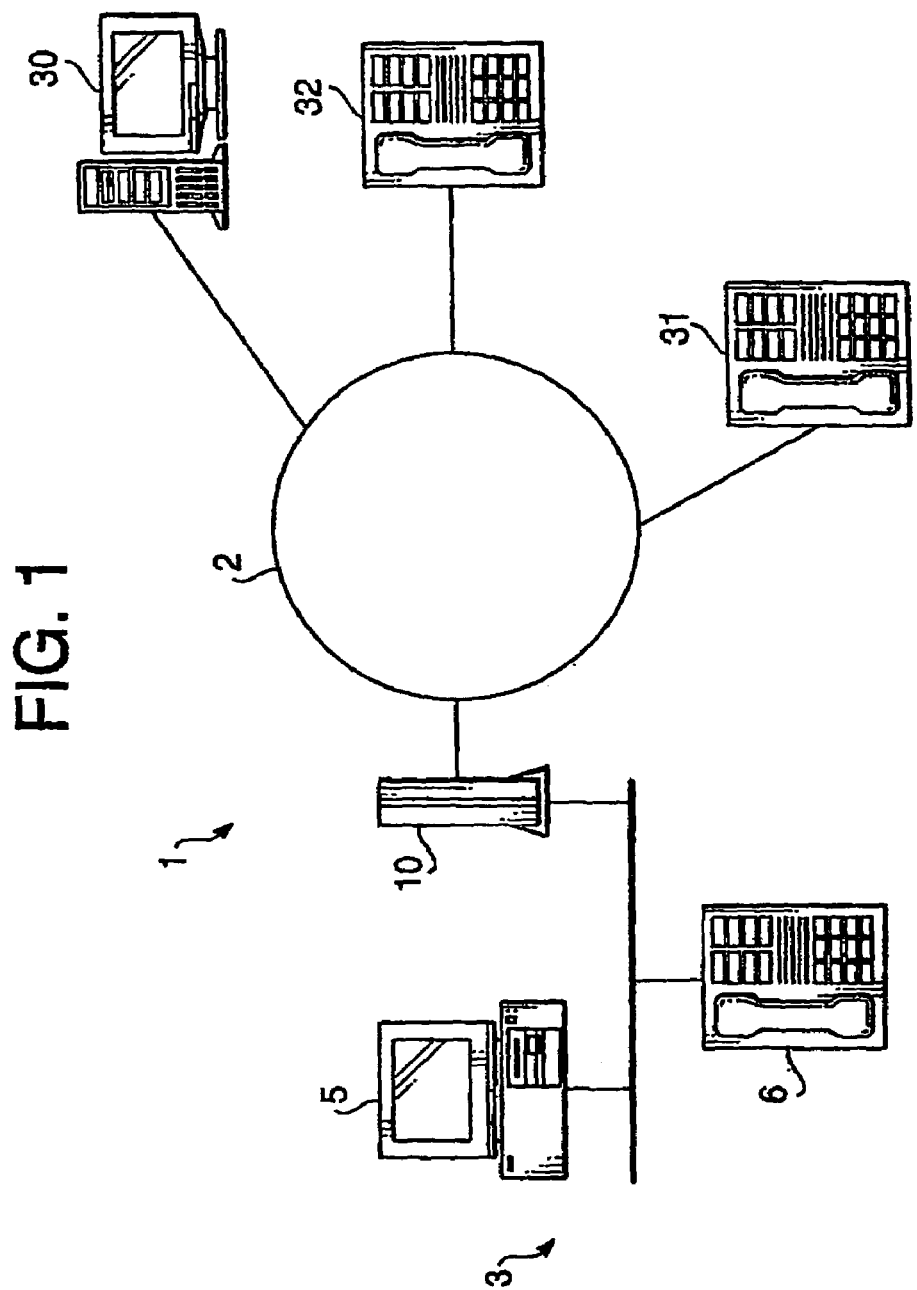
FIG. 1 shows a configuration of a network system including a router which is implemented with a packet communication control device according to an embodiment of the invention.

FIG. 1 shows a configuration of a network system 1 in which a router 10 implemented with a packet communication control device according to a first embodiment of the invention.

The network system 1 includes a LAN 3, a network 2, a router 10, terminals 5, 6, 31 and 32, and a gate keeper 30. The LAN 3 is a network, in which data packets are transmitted according to the IP, and employs a local addressing system. The network 2 is, for example, the Internet, in which the data packets are transmitted in accordance the IP. The network 2 is an upper network with respect to the LAN 3. The network 2 employs a global addressing system, which is different from the local addressing system. The router 10 is a communication control device which manages transmission/reception of data packets between the networks having different addressing systems. The router 10 is connected to the LAN 3 and the network 2. The terminals 6, 31 and 32 are IP telephones capable of performing voice communication according to H.323. The terminal 6 is connected to the LAN 3, and the terminals 31 and 32 are connected to the network 2. The terminal 5 is another terminal connected to the LAN 3. The gate keeper (SIP server for the SIP) 10 is a server that operates to perform conversion of telephone numbers and IP addresses according to H.323, an authentication operation according to H.323. The gate keeper 10 is connected to the network 2.

Figure 2A:
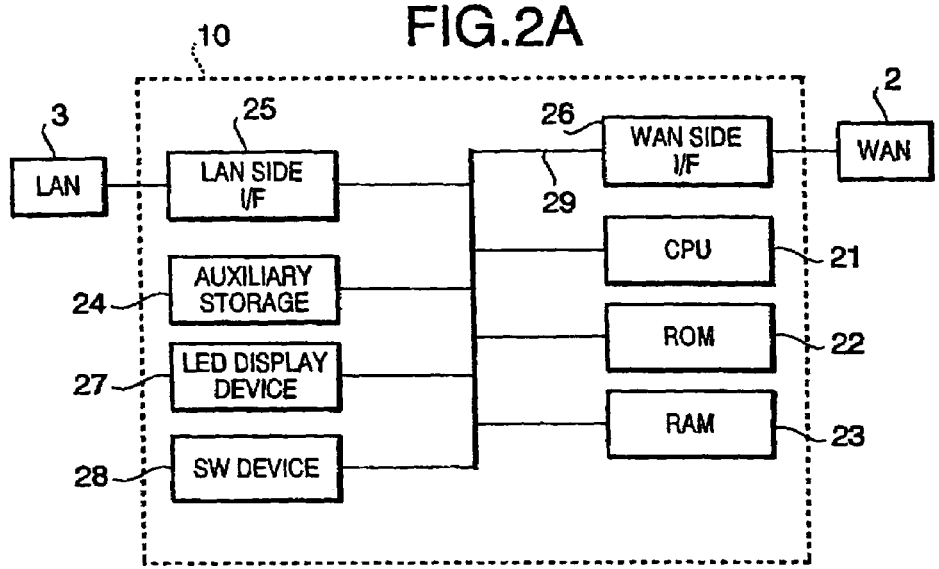
FIG. 2 is a block diagram showing a configuration of the router shown in FIG. 1.
Figure 2B:
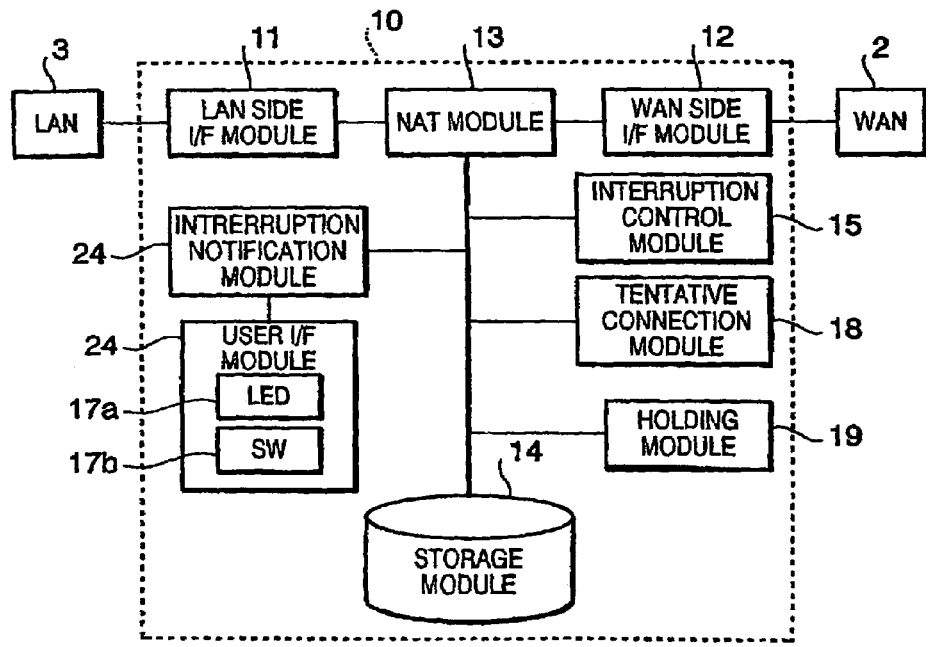

Next, the router 10 will be described in detail. FIGS. 2A and 2B show block diagrams of the router 10. Specifically, FIG. 2A shows an inner configuration of the router 10, and FIG. 2B shows a functional configuration of the router 10.

As shown in FIG. 2A, the router 10 includes a CPU (Central Processing Unit) 2, a ROM (Read Only Memory) 22, a RAM (Random Access Memory) 23, an auxiliary storing device 24, a LAN side network interface 25, a WAN side network interface 26, an LED display device 27, a switch device 28, and a data bus 29.

The CPU 21 is an operational processing device that performs various operations in accordance with commands stored in the ROM 22. The ROM 22 is a real only storage that stores programs to be executed by the CPU 21. The RAM 23 is a volatile memory which temporarily stores operational data of the CPU 21 when the router 10 operates. The auxiliary storing device 24 stores data including functional programs of the router 10, telephone numbers and IP addresses. The LAN side network interface 25 is an interface connected to the LAN 3. the WAN side network interface 26 is an interface connected to the network 2. The LED display device 27 is externally controlled to be turned ON/OFF the LED. The switch device 28 is operated by a user to output contact information representative of ON/OFF operation thereof. The signal bus 29 is a bundle of signal lines connected to all the devices described above, and transmits signals thereamong.

As shown in FIG. 2B, the router 10 includes a LAN side interface module 11, a WAN side interface module 12, an NAT module 13, a storage module 14, an interruption control module 15, an interruption notification module 16, a user interface 17, a tentative connection module 18, and a holding module 19. These functional modules are realized as the CPU 21 executes corresponding programs stored in the ROM 21, and controls the device/units described above.

The LAN side interface module 11 is an interface for connecting the LAN 3 to the router 10 using the LAN side network interface 25. The WAN side interface module 12 is an interface for connecting the network 2 to the router 10 using the WAN side network interface 26.

The NAT module 13 is for converting the IP addresses and ports written in the header and payload of each packet based on the correspondence table that is stored in the storage module 14. The NAT module 13 also converts IP addresses and ports of sending device and receiving device written in the header and payload of the packet in response to a request by the interruption control module 15.

Figure 3:
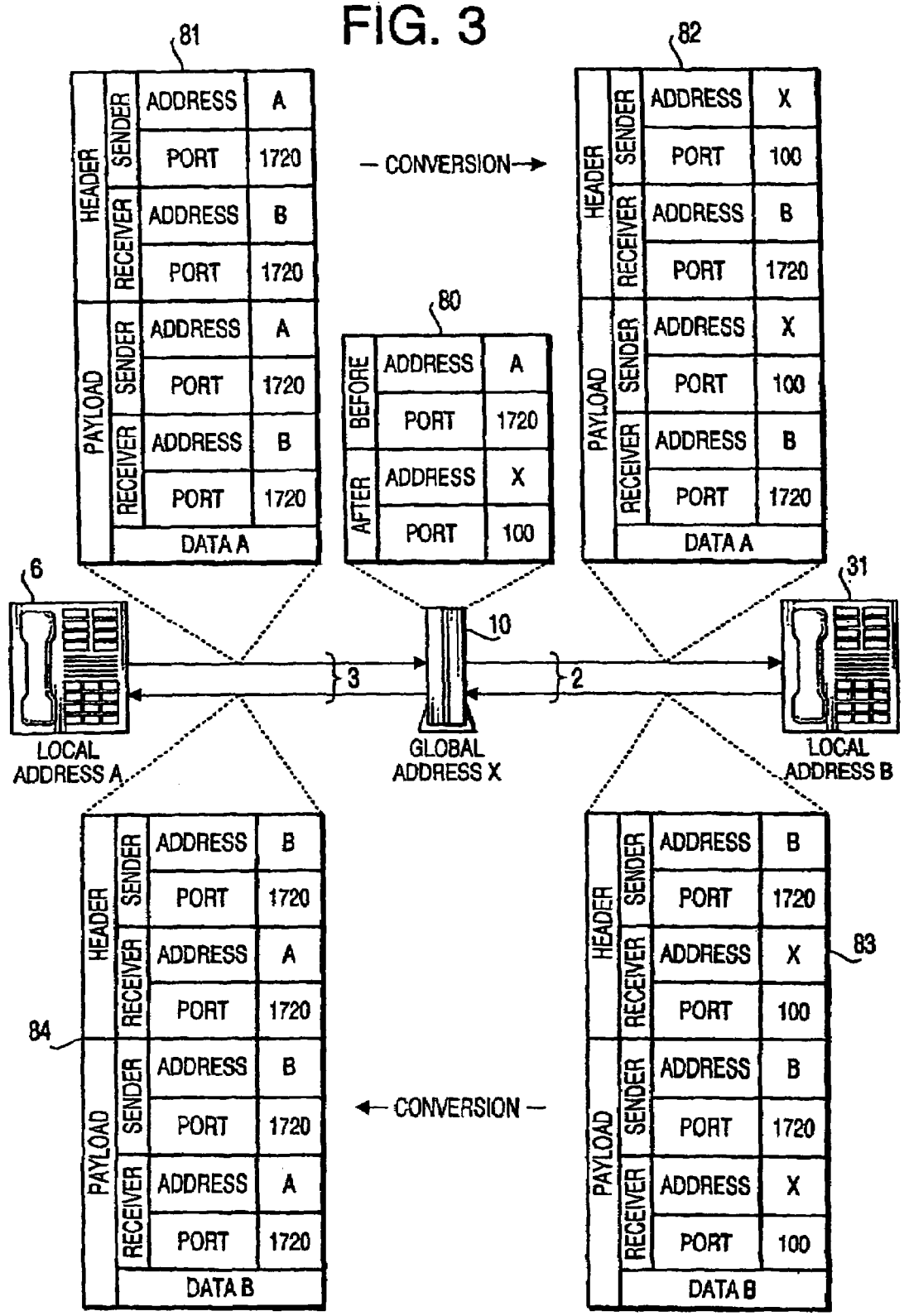
FIG. 3 shows a relationship between a Correspondence Table provided to the router and data packets which are converted based on the table.

The correspondence table will be described herein with reference to FIG. 3. FIG. 3 shows a relationship between the correspondence table and packets which are converted based on the correspondence table. In an example shown in FIG. 3, a terminal 6 having local address A and a terminal 31 having a global address B communicate via the router 10 having global address X.

When the router 10 receives a packet 81, which is transmitted from the terminal 6 to the terminal 31, a correspondence table 80 storing the IP addresses and ports of the sending terminal according to the local addressing system (before conversion by the NAT module 13) and those according to the global addressing system (after conversion by the NAT module 13) is created. It should be appreciated that the IP address according to the global addressing system is a global address assigned to the router 10. Regarding the port, an available port is assigned. As described above, the NAT module 13 converts the IP address and port of the packet 51 based on the correspondence table 80. The converted packet 82 is transmitted to the terminal 31. When the packet 82 is received, the terminal 31 refers to the IP address and port of the sending terminal written in the packet 82, creates a packet 83, and transmits the packet 83 to the terminal 6. Since the IP address written in the packet 83 transmitted by the terminal 31 is the IP address of the router 10, the packet 83 is received by the router 10. Then, the NAT module 13 detects the conversion table 80 having the receiving address and port same as those in the packet 83, and converts the IP address and port based on the conversion table 80. Thus converted packet 84 is transmitted to the terminal 6. It should be noted that such a correspondence table is provided for each port of the terminals having the local addressing system for connecting with the LAN 3.

The storage module 14 stores the followings in the auxiliary storage device 24:
the IP address and port for the NAT of the EP 1;
the IP addresses and ports of the EP 2 and EP 3;
the IP address and port for the NAT of the tentative connection module 18;
the IP address and the port for the NAT of the holding module 19;
a correspondence table of the IP addresses and ports converted during the communication between the EP 1 and EP 2;
a correspondence table of the IP addresses and ports converted during the communication between the EP 1 and EP 3;
a correspondence table of the IP addresses and ports converted during the communication between tentative connection module 18 and the EP 3;
a correspondence table of the IP addresses and ports converted during the communication between the holding module 18 and the EP 2;
"AuType" that is transmitted by "OpenLogicalChanel" based on session information in the communication between the EP 1 and EP 2 and terminal capability detected by the interruption control module 15 (when SIP, transmitted by "media field" and INVITE); and
an NAT usage flag.

It should be noted that EP is used as common name of the terminal, and in the embodiment, the EP 1 is a LAN side terminal, and EP 2 and EP 3 are WAN side terminals. The EP2 communicate with EP 1 according to H.323, while EP 3 represents a terminal which requests for communication according to E.323 to the EP 1 when the EP 1 and EP 2 communicate according to H.323.

IP addresses and ports of the EP 1, the tentative connection module 18 and the holding module 19 are those for converting the IP address of the packet transmitted from the EP 1 to the address assigned to the router 10, which is the address according to the global addressing system. It should be noted that the port is assigned at each transmission. The IP addresses and ports of the EP 2 and EP 3 are global addresses and ports of the EP 2 and EP 3. Each correspondence table stores a relationship between the IP addresses and ports before and after the conversion by the NAT module 13. The NAT module 13 stores the relationship between the IP addresses and ports according to the local addressing system of the packet received from LAN side and the IP addresses and ports according to the global addressing system after the conversion in each correspondence table. Then, the NAT module 13 converts the IP addresses and ports of the packet according to the global addressing system and received from the WAN side into the IP addresses and ports according to the local addressing system referring to the correspondence table.

The interruption control module 15 controls an interruption communication between the EP 3 and EP 1 according to H.323 when the EP 1 and EP 2 communicate according to H.323. The interruption control module 15 detects a communication request with respect to EP 1 according to H.323. When the communication request is transmitted from the EP 2, the interruption control module 15 detects session information and terminal capability determined during a negotiation between the EP 1 and EP 2, and stores the detected session information and "AuType" which is informed through the "OpenLogicalChannel" based on the terminal capability in the storage module 14.

When the communication request is transmitted from the EP 3, the interruption notification module 16 confirms admission of communication between the EP 1 and EP 3, and then the channel open proceeding according to H.245 is executed between the tentative connection module 18 and the EP 3. Then, the interruption control module 15 requests the NAT module 13 to execute the conversion of the IP addresses and ports written in the packet so that the communications between the holding module 19 and EP 2, and between the EP 1 and EP 3 are enabled.

When the interruption control module 15 detects that the EP 3 has requested for the communication according to H.323, the interruption notification module 16 notifies a user of the same. Further, the interruption notification unit 16 detects when the admission is obtained from the user of the EP 1. The interruption notification module 16 notifies the user of the EP 1 of the communication request and receives the admission by the user of the EP 1 via the packet communication with the EP 1 and the user interface 17.

The user interface 17 includes an LED 17a functioning as a display unit, and a switch 17b functioning as an operation unit. When the EP 3 executes a request for communication according to H.323, the user interface 17 drives the LED display device 27 to light the LED 17a under control of the interruption notification module 16. When the EP 3 detects that the user of the EP 1 accept the communication request from the EP 3 and operates the switch 17b via the switch device 28, the user interface 17 outputs the detection results to the interruption notification module 16.

The tentative connection module 18 executes H.245 proceeding, in response to the request from the interruption control module 15, with respect to the EP 3, which performs the connection request according to H.323 with the EP 1. According to the embodiment, the tentative connection module 18 is assigned with a local address for the LAN 3, and the tentative connection module 18 functions as a single local terminal.

The holding module 19 executes a communication according to H.323 with the EP 2 instead of EP 1 in response to the request from the interruption control module 15 when the EP 1 and EP 3 communicate according to H.323 proceeding. The holding module 19 is assigned with a local address for the LAN 3, and, similarly to the tentative connection module 18, the holding module 19 functions as a single local terminal. When the holding module 19 and the EP 2 communicate, a data packet including audio information indicating a holding condition from the holding module 19 to the EP 2.

Figure 16:
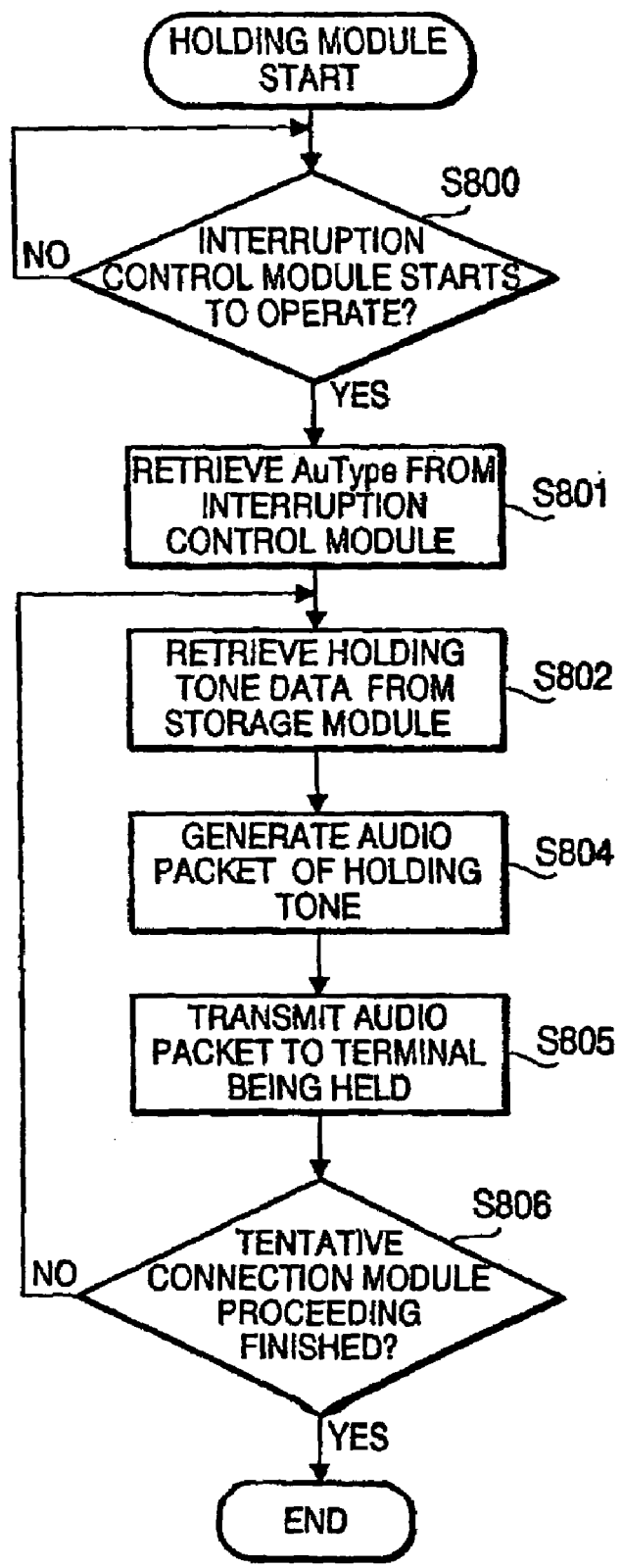
FIG. 16 shows a flowchart illustrating a procedure, executed by the holding module, for transmitting a holding tone.

FIG. 16 shows a flowchart illustrating a procedure, executed by the holding module 19, for transmitting a holding tone to the EP 2. The procedure is performed as the CPU 21 executes a suitable program stored in the ROM 22. As this procedure is performed, a audio data packet containing audio data of the holding tone is transmitted to the EP 2 which is currently held.

Figure 4:
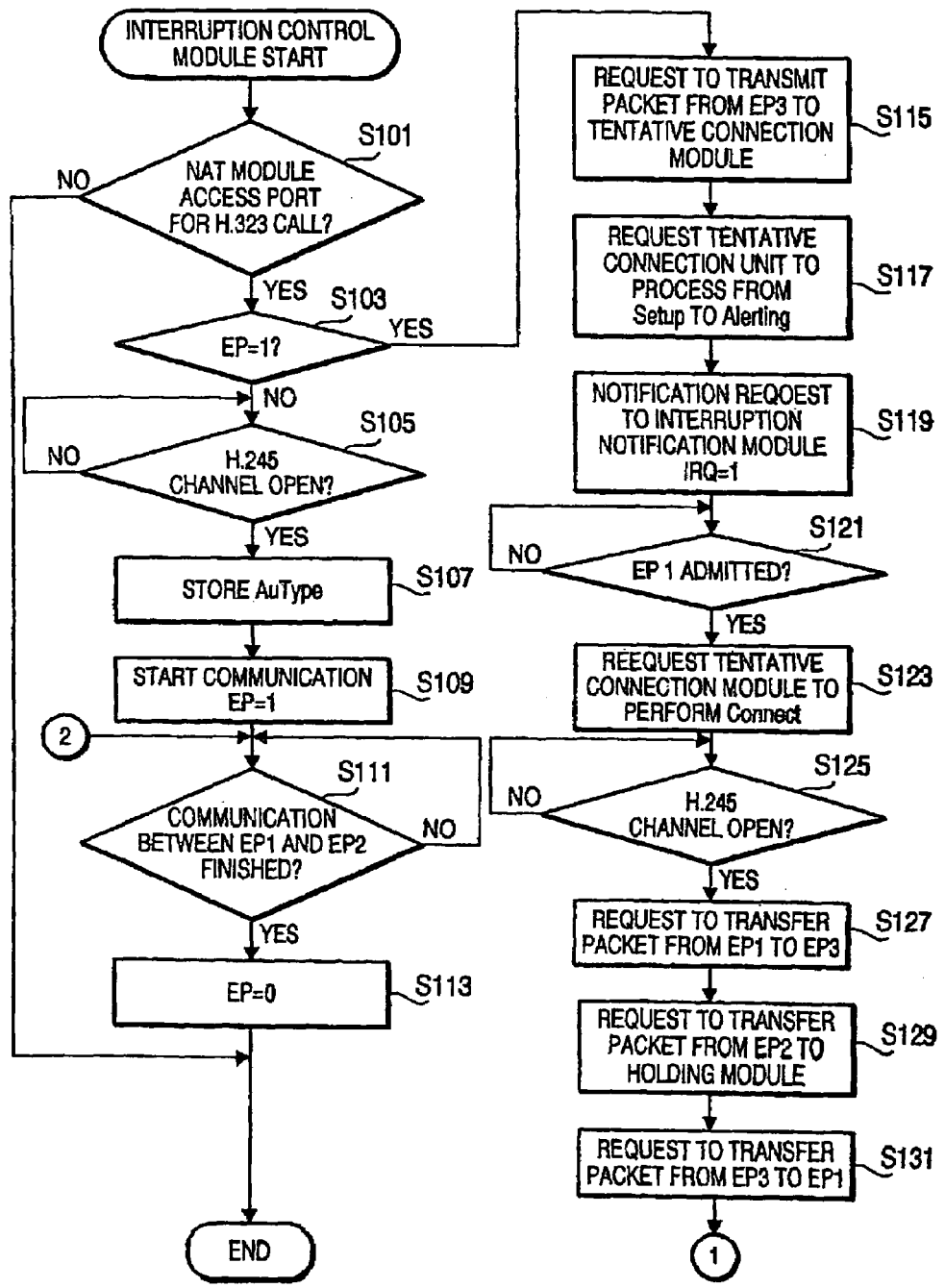
FIG. 4 is a flowchart illustrating an operation executed by an interruption control unit shown in FIG. 2.

In FIG. 16, in S800, process determines whether the interruption control module 15 starts to operate (see S129 of FIG. 4). When the interruption control module 15 starts to operate (S800: YES), process retrieves the value of "AuType" from the interruption control unit 15 (S801). Then, process retrieves audio data that meets the data format represented by the retrieved "AuType" from among a plurality of pieces of audio data stored in the storage module 14 (S802).

It should be noted that, a plurality of pieces of audio data respectively corresponding to a plurality of types of the audio data represented by the "AuType" are prepared and stored in the storage module 14 in advance, and from among the thus stored plurality of pieces of data, one corresponding to the retrieved "AuType" is selected.

Alternatively or optionally, the router 10 may modified to include a microphone, a microphone amplifier for amplifying the audio signal output by the microphone, an A/D converter that converts the analog output signal of microphone amplifier to a digital audio signal, and an encoder that converts the digital audio signal to an encoded signal (e.g., a compressed signal) that meets the data type represented by the "AuType". If the router 10 is configured as above, the user of the router can create a holding tone using the microphone, which is stored in the storage module 14 and can be retrieved when the holding tone is transmitted.

In S804, process creates a data packet containing the holding tone data as retrieved, and transmits the thus created data packet to the EP 2 (S805), which is currently held.

Figure 5:
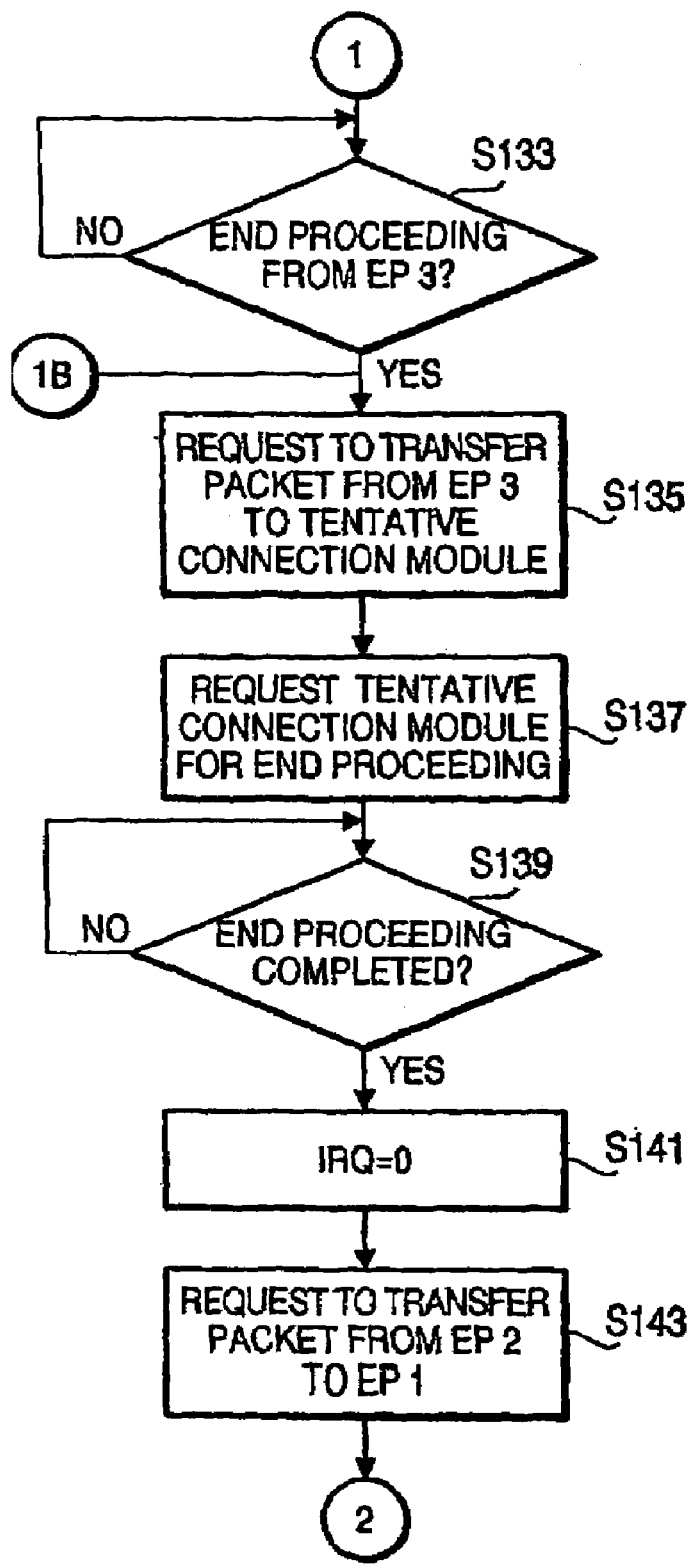
FIG. 5 is a flowchart illustrating an operation executed by an interruption control unit shown in FIG. 2.

In S806, process determines whether the tentative connection module 18 still retains the holding condition (see S139 of FIG. 5). When the procedure of the tentative connection module 18 as shown in FIG. 5 has not been finished (S806: NO), process returns to S802 and repeats the above-described proceedings. When the procedure of the tentative connection module 18 has been finished (S806: YES), the procedure shown in FIG. 16 is terminated, and transmission of the holding tone is stopped.

Since no tone is heard at the EP 2 (terminal 31) while being held, the user of the EP 2 may have a kind of ill feeling. When the holding tone is heard, such a feeling is avoidable.

Further, when a firewall is implemented between the router 10 and WAN (network 2), if the connection from the EP 2 uses a port but no packets are transmitted/received between the router and EP 2, the firewall may determines that a hacking operation (e.g., a back door opening of devices on the LAN 3) and disconnect the EP 2 from the router 10. By transmitting the packets continuously from the router 10 to the EP 2, such a malfunction of the firewall can be avoided.

The holding module 19 further executes a termination procedure of a packet transmitted from the EP 2. The termination procedure means no processing with respect to the packet including the audio information, and a processing for initiating the end proceeding of the call communication with respect to a packet requesting the end proceeding of the call connection.

Next, operations of main functional modules of the router 10 will be described referring to the drawing.

Firstly, a procedure of the interruption control module 15 will be described. FIGS. 4 and 5 shows a flowchart illustrating a procedure of the interruption control module 15. The procedure shown in FIGS. 4 and 5 is executed at every predetermined period. In S101, process determines whether the a packet, which is to access the port 1720 for calling the H.323, arrives at the NAT module 13 via the WAN side interface 12. When the packet to access the port 1720 has not reached the NAT module 13 (S101: NO), process is finished. In such a case, in the subsequent executions of the procedure, process repeats S101 until the packet to access the port 1720 has reached the NAT module 13.

When the packet to access the port 170 has arrived at the NAT module 13 (S101: YES), process proceeds to S103, where process determines whether the EP 1 is executing the communication according to H.323. It should be noted that whether the EP 1 is communicating according to H.323 is detected based on a flag EP indicative of a communicating status of the EP 1. Specifically, when EP=0, the EP 1 is non-communicating status. The port number regarding transmission/reception call is not determined unambiguously. Thus, only one port (e.g., port 1720) may be used fixedly, or a plurality of ports are preliminary determined on the router side, and the gate keeper may designate one of the port numbers to be used at every transmission/reception of a call.

When process determines that the EP 1 is not communicating according to H.323 (i.e., EP=0) (S103: NO), process proceeds to S105, where process determines whether the channel open according to H.245 is executed. When the channel open has not yet been executed (S105: NO), process repeats S105 until the channel open according to H.245 is executed. When process detects that the channel open proceeding has been executed (S105: YES), process proceeds to S107. In S107, process detects the session information and terminal capability determined during the negotiation between the EP 1 and EP 2 when the channel open according to H.245 was executed, and stores the detected session information and the "AuType" obtained through the "OpenLogicalChannel" based on the terminal capability in the storage module 14. Thereafter, process proceeds to S109, where the EP flag is set to 1 (EP=1). Next, process proceeds to S111, and determines whether the communication between the EP 1 and EP 2 is finished. When the communication between the EP 1 and EP 2 has not bee finished (S111: NO), process returns to S111 and repeats the same until the communication between the EP 1 and EP 2 is finished. When the communication between the EP 1 and EP 2 is finished (S111: YES), process proceeds to S113, and sets the EP flag to zero (EP=0). It should be noted that, when the procedure shown in FIGS. 4 and 5 is executed, even if the loop S111 is repeated, the procedure shown in FIGS. 4 and 5 is called recursively at every predetermined interval.

When process determines that the EP 1 is communicating according to H.323 (i.e., EP=1) (S103: YES), process proceeds to S115 where process requests the NAT module 13 to transfer the packet received from the EP 3 to the tentative connection module 18. Incidentally, the NAT module 13, when received the transfer request from the interruption control module 15, converts the IP addresses and ports written in the packet that is transmitted from the EP 3 to EP 1 from those for the EP 1 to those directed to the tentative connection module 18. Thereafter, control proceeds to S117 and requests the tentative connection module 18 to execute the proceeding, with respect to the EP 3, from Setup to Alerting. Next, process proceeds to S119, and sets the flag IRQ representing that there is a request for interruption communication from the EP 3 to one (i.e., IRQ=1). With this proceeding, it becomes possible to notify to the interruption notification module 16 that there is a request for interruption communication from the EP 3.

Figure 6:
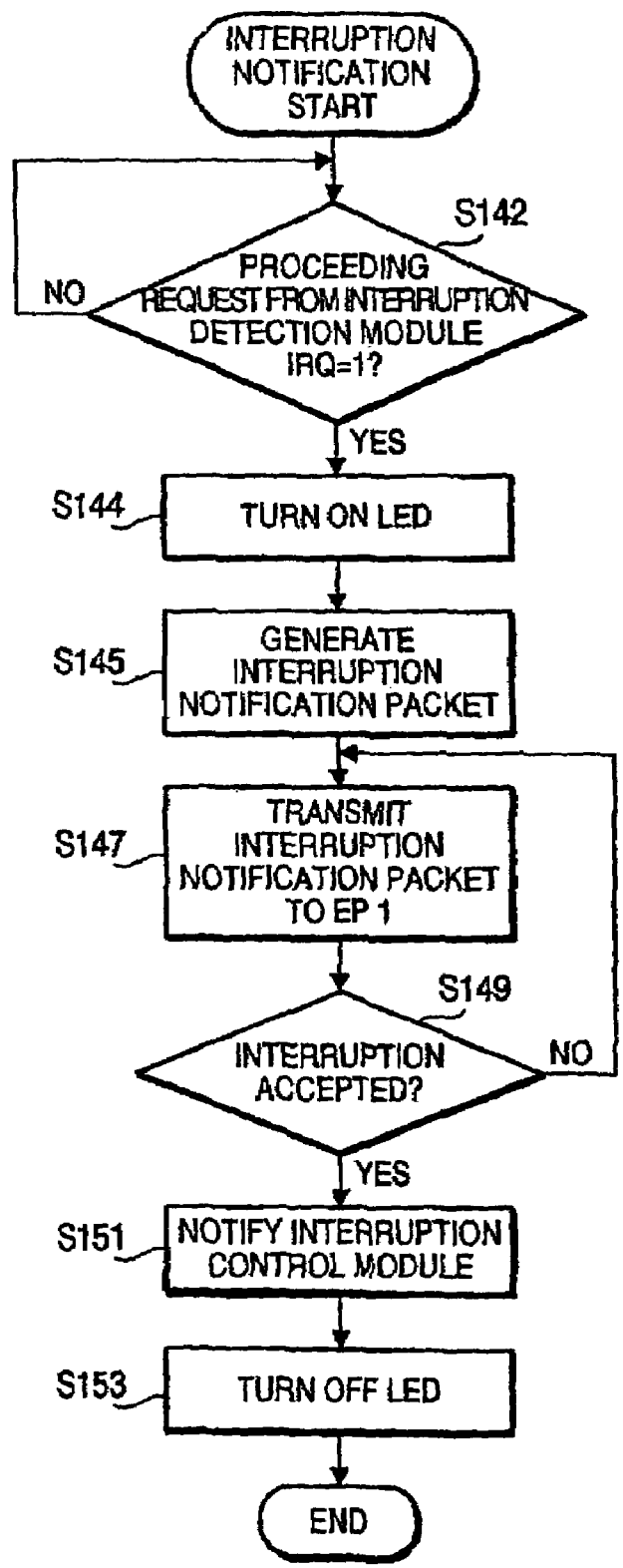
FIG. 6 is a flowchart illustrating an operation executed by an interruption control unit shown in FIG. 2.

Next, process proceeds to S121 and determines whether the interruption module 16 detects the admission from the user of the EP 1 (see S151 of FIG. 6). When the admission from the user of the EP 1 has not been detected (S121: NO), process returns to S121 and repeats the step until the admission from the user of the EP 1 is detected. When the admission from the user of the EP 1 is detected (S121: YES), process proceeds to S123, and requests the tentative connection module 18 for execution of Connect. Then, in S125, process determines whether the channel open according to H.245 is executed between the tentative connection module 18 and the EP 3. When the channel open according to H.245 has not been executed between the tentative connection module 18 and the EP 3 (S125: NO), process repeats S125 until the channel open according to H.245 is executed between the tentative connection module 18 and the EP 3.

When it is determined that the channel open according to H.245 is executed between the tentative connection module 18 and the EP 3 (S125: YES), process proceeds to S127 and requests the NAT module 13 to transfer the packet transmitted from the EP 1 to the EP 3. Then, in S129, process requests the NAT module 13 to transfer the packet transmitted from the EP 2 to the holding module 19. Then, process proceeds to S131 and requests the NAT module 13 to transfer the packet transmitted from the EP 3 to the EP 1.

It should be noted that the NAT module 13, when received the transfer request from the interruption control module 15, converts the sending IP addresses and ports written in the packet transmitted from the EP 1 to EP 2 from those of the EP 1 to those of the tentative connection unit 18 and the receiving IP addresses and ports from those of the EP 2 to those of the EP 3, converts the receiving IP addresses and ports written in the packet transmitted from the EP 2 to EP 1 from those of the EP 1 to those of the holding module 19, converts the sending IP addresses and ports written in the packet transmitted from the EP 3 to EP 1 from those of the EP 3 to those of the EP 2 and receiving IP addresses and ports from those of the tentative connection module 18 to those of the EP 1.

Then, process proceeds to S133, where it is determined whether the EP 3 executes the end proceeding request. When the EP 3 has not executed the end proceeding request (S133: NO), process repeats S133 until the EP 3 execute the end proceeding request. When the EP 3 has executed the end proceeding request (S133: YES), in S135, process requests the NAT module 13 to transfer the packet transmitted from the EP 3 to the tentative connection unit 18. Incidentally, the NAT module 13, when received the transfer request from the interruption control module 15, stops converting the sending and receiving IP addresses and ports written in the packet transmitted from the EP 3 to EP 1.

Then, in S137, process requests the tentative connection module 18 to execute the end proceeding according to H.245 between the tentative connection module 18 and the EP 3. In S130, process determines whether the end proceeding according to H.245 between the tentative connection module 18 and the EP 3 has finished. When the end proceeding has not finished (S139: NO), process repeats S130 until the end proceeding has been finished. When the end proceeding according to H.245 between the tentative connection module 18 and the EP 3 has been finished (S139: YES), process proceeds to S141. In S141, process sets the flag IRQ, which indicates whether the interruption communication has been requested, to zero (i.e., IRQ=0). In S143, process requests the NAT module 13 to transfer the packet transmitted from the EP 2 to the EP 1. Incidentally, when the transfer request is received from the interruption control module 14, the NAT module 13 stops converting the receiving IP addresses and ports written in the packet transmitted from the EP 2 to EP 1. Thereafter, process returns to S111 and repeats the step until the communication between the EP 1 and EP 2 is finished.

Next, a procedure of the interruption notification module 16 will be described referring to FIG. 6, which shows a flowchart of the procedure.

In S142, process determines whether the flag IRQ, which indicates whether the interruption communication has been requested by the EP 3, is set to 1 (i.e., IRQ=1). When IRQ is not equal one (S142: NO), process repeats S141 until IRQ is set to one. When it is determined that IRQ=1 (S142: YES), process proceeds to S144, and turns ON the LED of the user interface module 17. Thereafter, in S145, process creates a packet for sending a notification to the EP 1. Next, in S147, the packet created in S145 is transmitted to the EP 1. The notification packet is forcibly interrupted in the packets transmitted from the EP 2 to EP 1.

Next, in S140, process determines whether the interruption communication of the EP 3 is accepted. Whether the interruption communication of the EP is accepted or not is detected by checking the contents of the packet received as a reply to the packet that was transmitted in S147, or by detecting that a switch of the user interface module 17 is depressed by the user of the EP 1. When process determines that the interruption communication of the EP 3 is not accepted (S149: NO), process returns to S147, and transmits the interruption notification packet created in S145 to the EP 1. When the interruption communication of the EP 3 is accepted (S149: YES), process proceeds to S151 and notifies the interruption control module 14 of the admission of the interruption communication of the EP 3 (see S121 of FIG. 4). Then, in S153, process turns OFF the LED of the user interface module 17.

Figure 7:
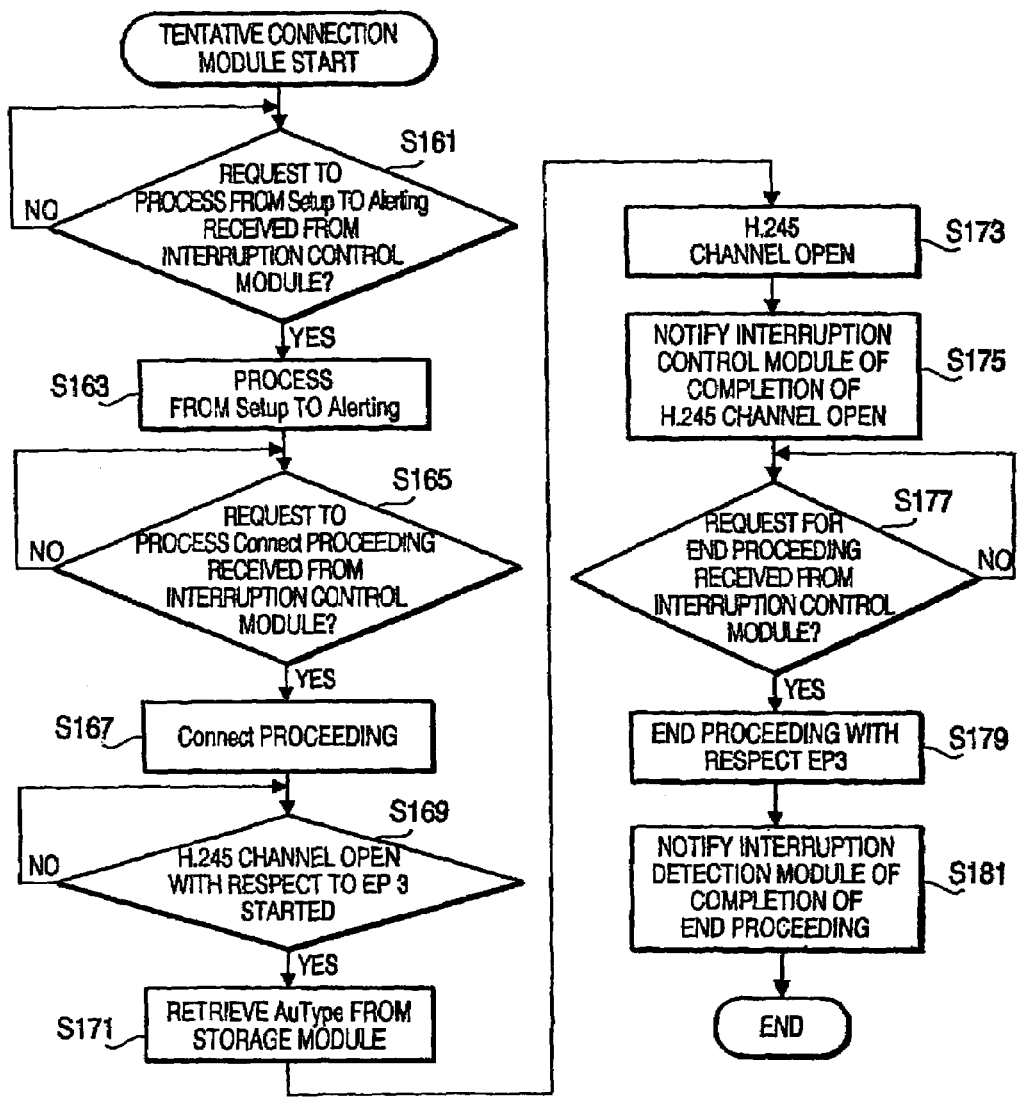
FIG. 7 is a flowchart illustrating an operation executed by a tentative connection unit shown in FIG. 2.

Next, a procedure performed by the tentative connection module 18 will be described referring to a flowchart shown in FIG. 7.

In S161, process determines whether a request to execute, with respect to the EP 3, proceedings from Setup to Alerting has been received from the interruption control module 15 (see S117 of FIG. 4). When such a request has not been received (S161: NO), process returns to S151 and repeats S151 until such a request is received. When the request for the execution of the proceedings from Setup to Alerting has been received (S161: YES), process proceeds to S163, where the proceedings from the Setup to Alerting are executed. Then, in S165, process determines whether the execution request of Connect is received from the interruption control module 15 (see S123 of FIG. 4). When it is determined that the execution request of Connect (S165: NO), process returns to S165, and repeats the step until the execution request of Connect is received. When the request for the execution of Connect is received (S165: YES), process proceeds to S167 and effects the Connect execution.

After execution of S167, process proceeds to S169 and determines whether the channel open according to H. 245, with respect to the EP 3, can be executed. When it is determined that the channel open according to H.245 with respect to the EP 3 cannot be initiated (S169: NO), process repeats S169 until the channel open is initiated.

When it is determined that the channel open can be initiated (S169: YES), in S171, process retrieves "AuType" which is used in the communication according to H.323 between the EP 1 and EP 2 and is stored in the storage module 14 (see S107 of FIG. 4). Thereafter, in S173, process executes a channel opening according to H.245 with respect to the EP 3 in accordance with the "AuType" retrieved in S171.

In S175, process notifies the interruption control module 15 of the completion of the channel opening according to H.245 (see S125 of FIG. 4). Then, process proceeds to S177 and determines whether an end procedure request according to H.245 is received from the interruption control module 15 (see S137 of FIG. 5). when it is determined that the end procedure request according to H.245 has not been received (S177: NO), process returns to S177 and repeats the step until the end procedure request is received. When it is determined that the end procedure request has been received (S177: YES), process proceeds to S179 and executes the end procedure, with respect to the EP 3, according to H.245. Thereafter, process proceeds to S181 and notifies the interruption control module 15 of the completion of the end procedure according to H.245 (see S139 of FIG. 5).

Figure 8:
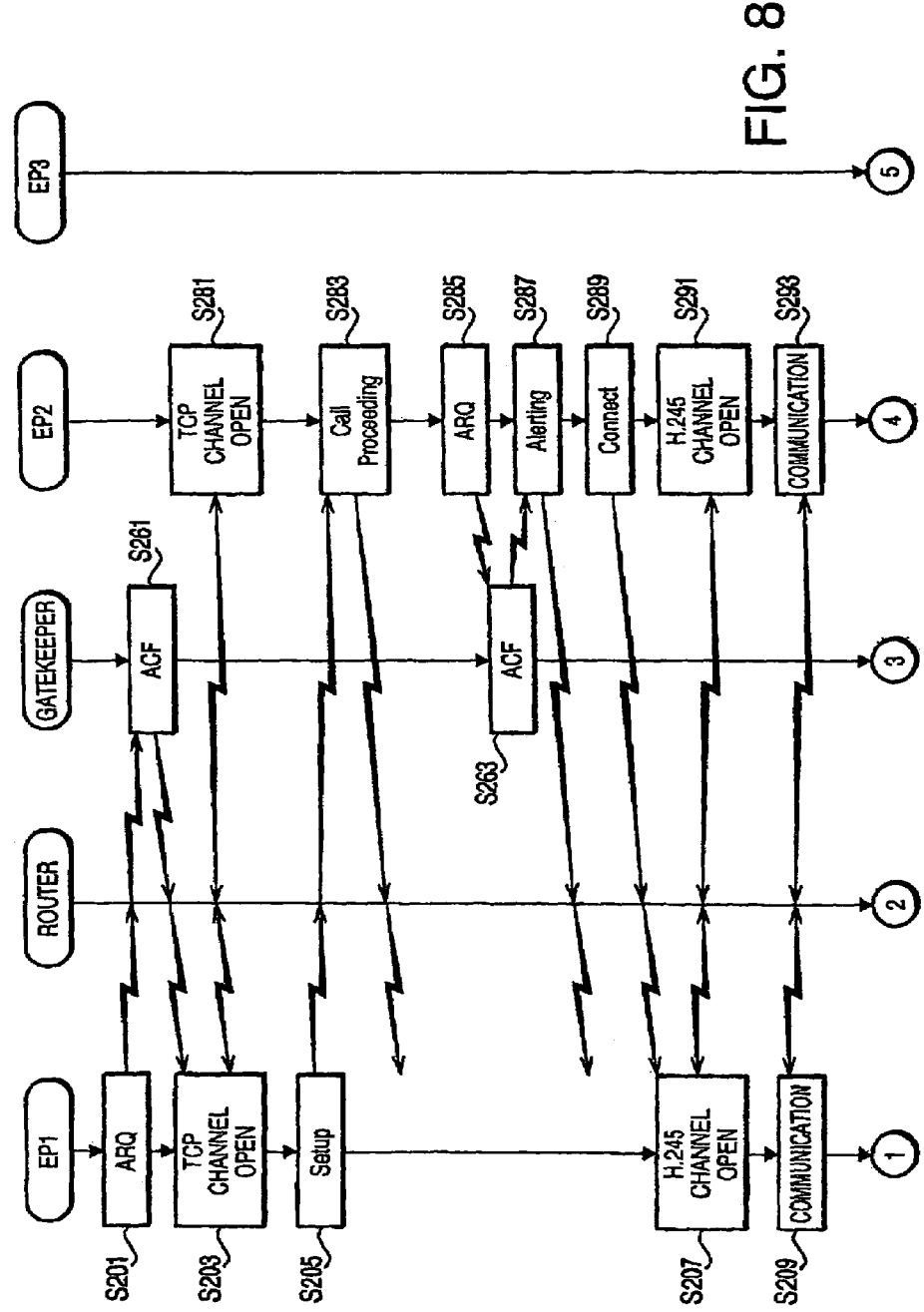
FIGS. 8-10 show an operational sequence of the network system shown in FIG. 1.
Figure 9:
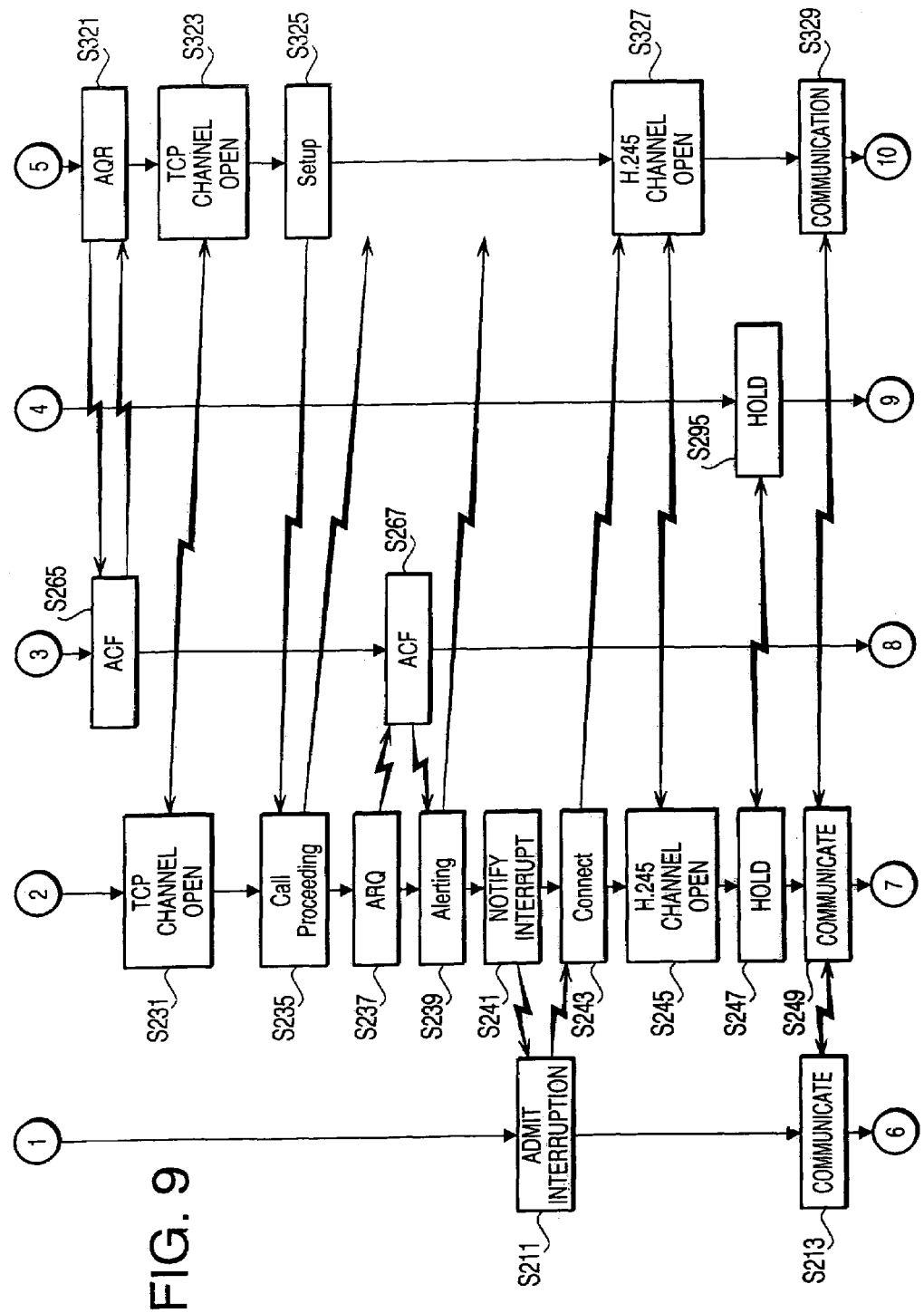
Figure 10:
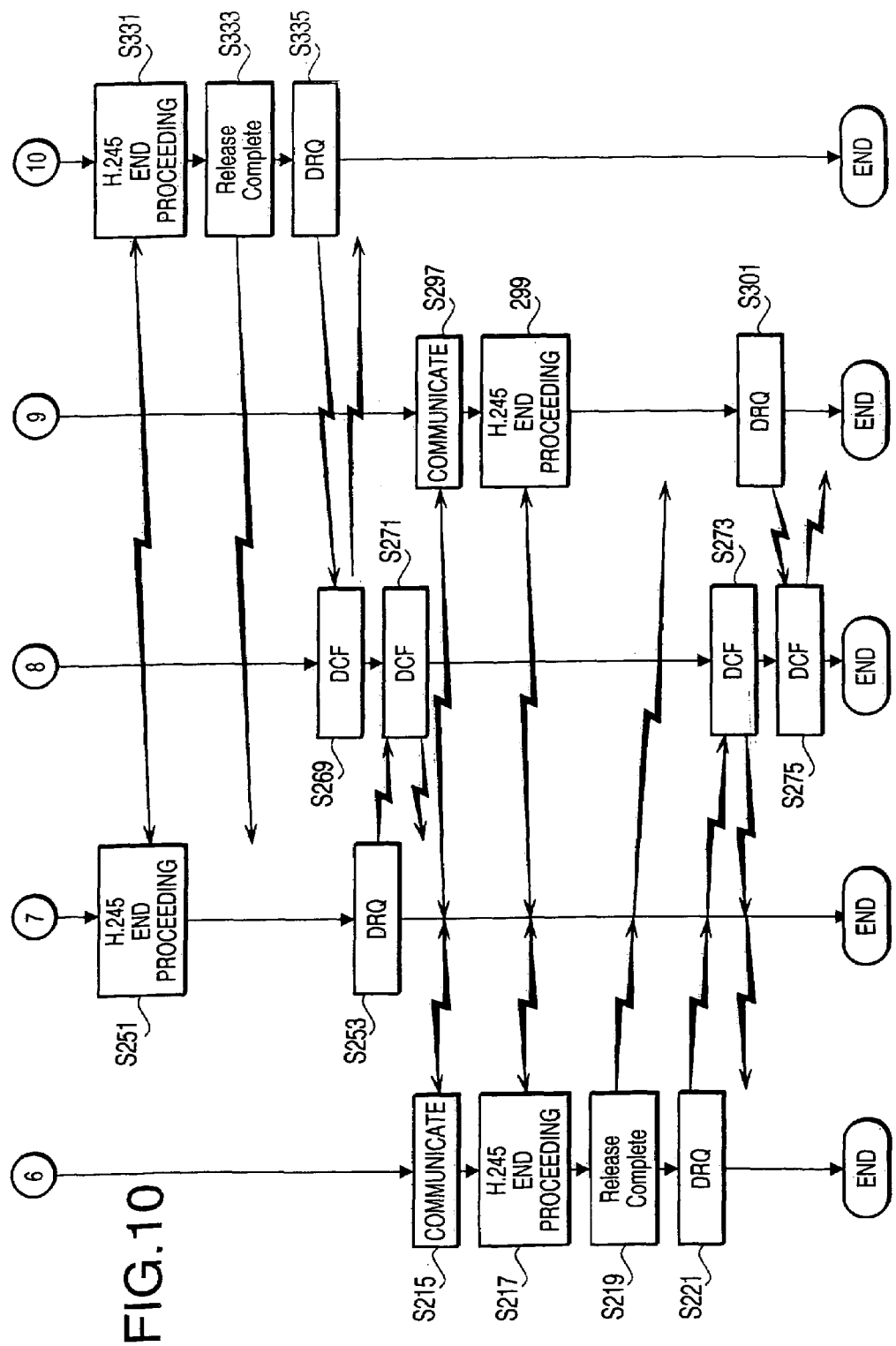
Figure 11:
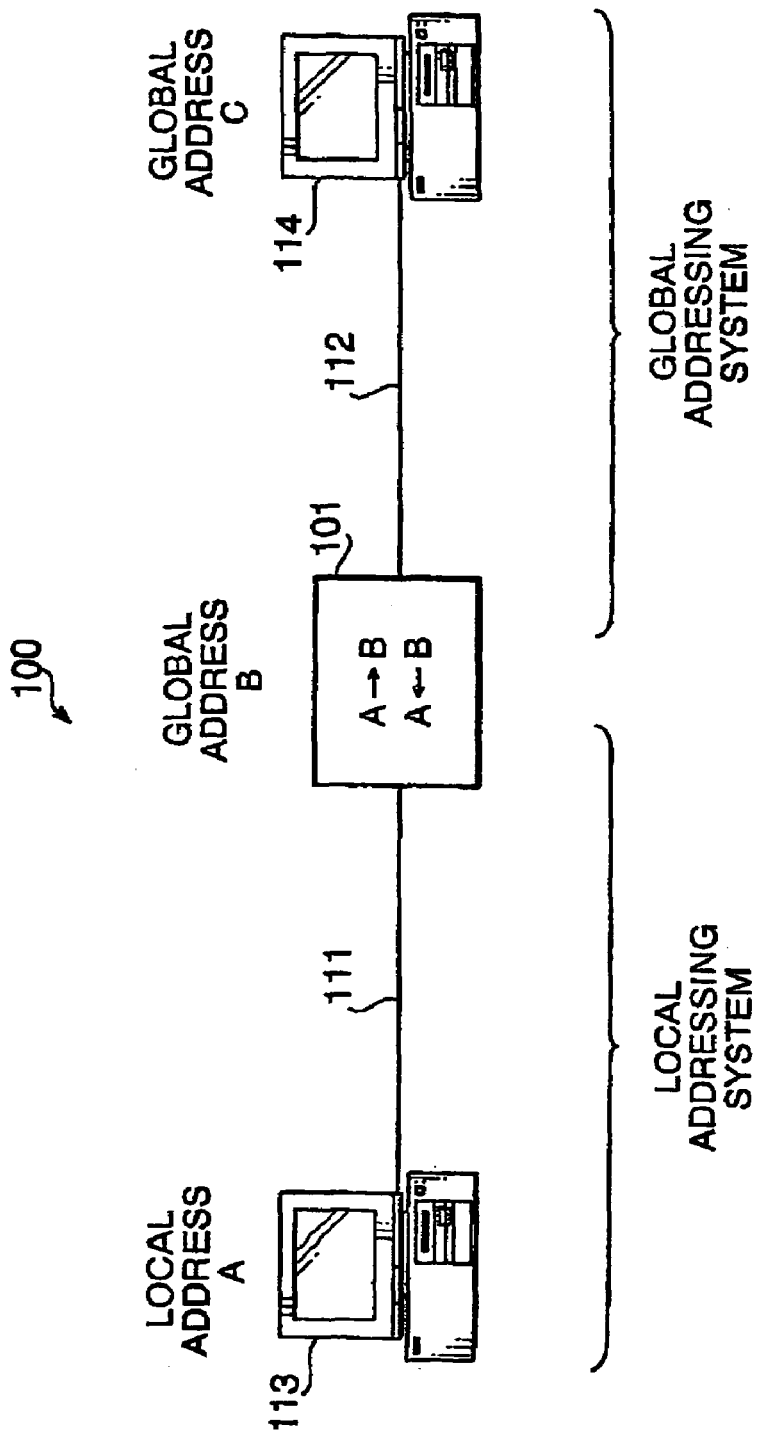
FIG. 11 shows a configuration of a network system employing a conventional conversion method of IP addresses.
Figure 12:
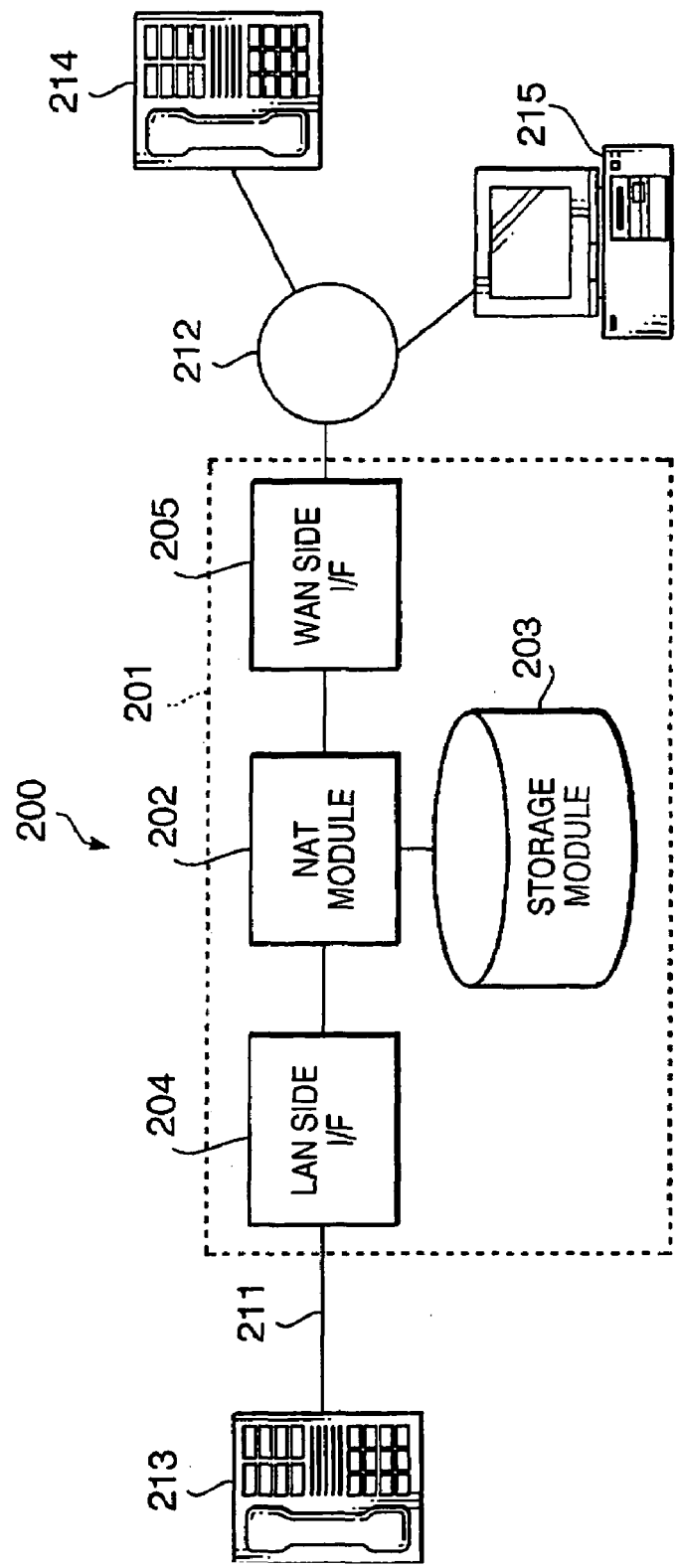
FIG. 12 shows a configuration of a conventional voice communication system.
Figure 13:
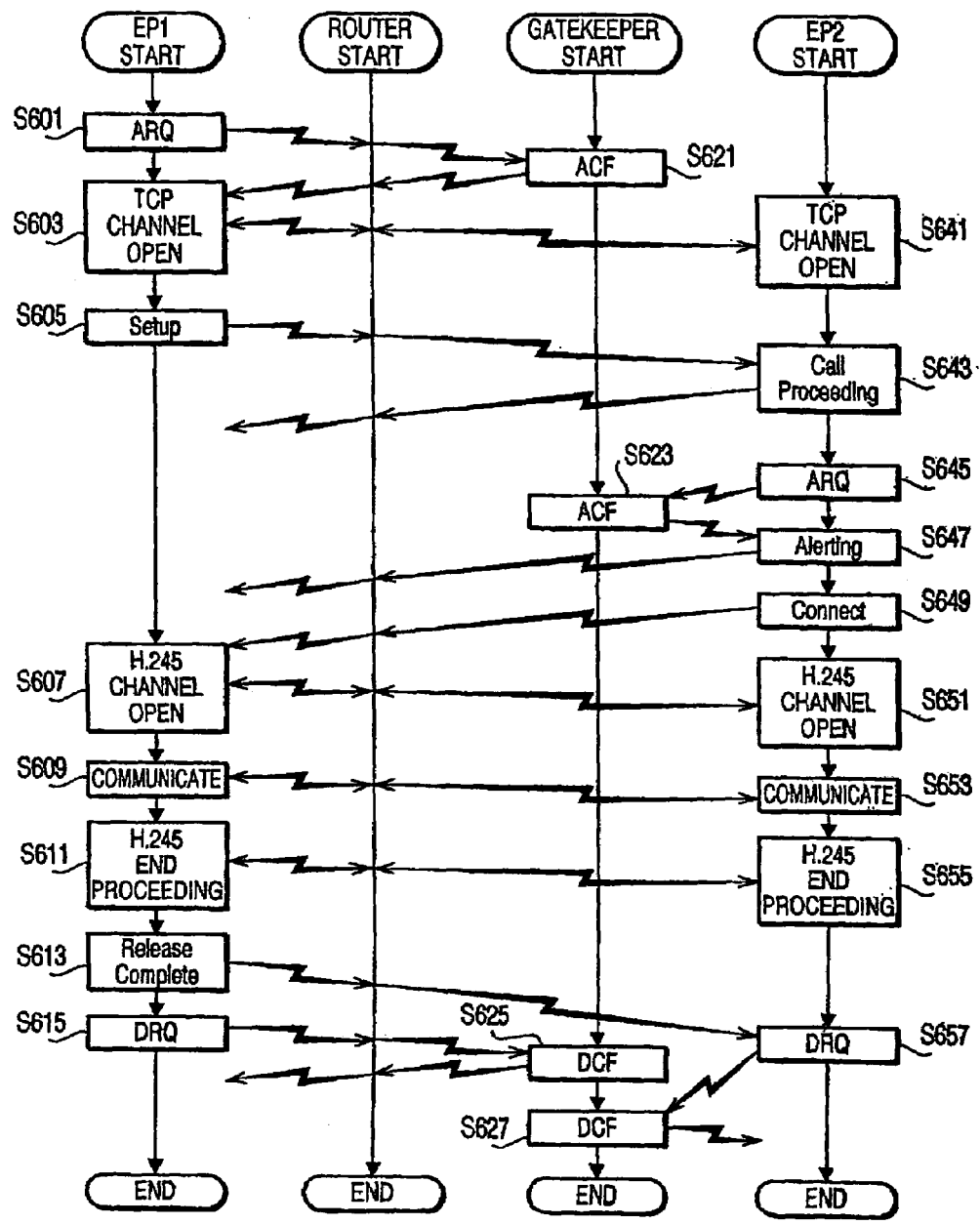
FIG. 13 shows an operational sequence of the conventional voice communication system shown in FIG. 12.

Next, operation of the network system 1 will be described with reference to FIGS. 8 through 10, which are operational sequence diagrams of the network system 1. It should be noted that FIGS. 8 and 9 show sequences when the terminal 32 (EP 3) performs a communication with respect to the terminal 6 when the terminal 6 (EP 1) has requested terminal 31 (EP 2) for communication and the communication is being executed.

Firstly, the terminal 6 transmits the ARQ to the gate keeper 30 (S201). When the ARQ transmitted by the terminal 6 is received, the gate keeper 30 transmits the ACF to the terminal 6 (S261). The terminal 6, when received the ACF transmitted from the gate keeper 30, executes the channel open of the TCF with respect to the terminal 31 (S203 and S281).

After the channel open of the TCP is completed, the terminal 6 transmits Setup (S205), which is a forward message attempting to connect the H.323 entity of itself with the H.323 entity of the terminal 31. When the above message is transmitted, port 1720 which is used in the H.225 that is compliant with H.323 is used. When Setup transmitted by the terminal 6 is received, the terminal 31 transmits "CallProceeding" which is a backward message notifying the terminal 6 of the employment of the ringing control (S283). Thereafter, the terminal 31 transmits the ARQ to the gate keeper 30 (S285). The gate keeper 30, when receives the ARQ transmitted from the terminal 31, transmits the ACF to the terminal 31 (S263). When the terminal 31 receives the ACF transmitted from the gate keeper 30, rings the ringing bell of itself and transmits Alerting to the terminal 6 to notify of the reception of the ACF signal (S287). Thereafter, when the terminal 31 responds, Connect is transmitted to the terminal 6 to notify that the terminal 31 has responded (S289).

The terminal 6, when receives Connect transmitted by the terminal 31, starts execution of channel opening according to H.245 for communicating with the terminal 31 (S207, S291). During the channel opening according to H.245, the terminal capability and session information which are determined during the negotiation between the terminals 6 and 31 are detected. It should be noted that, based on the terminal capability, "AuType" which is informed through "OpenLogicalChannel" is determined. The router 10 stores the session information and "Autype" in the storage module 14 (see S107 of FIG. 4). When the channel opening according to H.245 is finished, the communication according to H.323 is started between the terminals 6 and 31 (S209, S293). Since the communication between the terminals 6 and 31 mainly includes a voice communication, it is executed in accordance with UDP (User Datagram Protocol).

When the terminals 6 and 31 perform the communication, the terminal 32 (EP 3) transmits the ARQ to the gate keeper in order to communicate with the terminal 6 (S321). When the ARQ is received from the terminal 32, the gate keeper 30 transmits the ACF to the terminal 32 (S265).

Next, the terminal 32, when receives the ACR transmitted by the gate keeper 30, attempts to execute channel opening according to TCP with respect to the terminal 6. However, at this stage, the terminal is communicating with the terminal 31. Therefore, even if the packet reaches the port 1720, the communication cannot be initiated. The router 10 then detects the condition, and the interruption control module 15 requests the NAT module 13 to transmits the packet output by the terminal 32 to the tentative connection module 18 (see S115 of FIG. 4), and then requests the tentative connection module 18 to executes the proceedings from Setup to Alerting between the tentative connection module 18 and the terminal 32 (see S117 of FIG. 4). Then, the packet transmitted from the terminal 32 to the terminal 6 is further transmitted to the tentative connection module 18 by the NAT module 13, and the tentative connection module 18 executes the channel opening according to the TCP between the tentative connection module 18 and the terminal 32 (S231, S323).

When the channel opening according to the TCP is completed, the terminal 32 transmits Setup to the tentative connection module 18 (S325). When the Setup transmitted for the terminal 32 is received, the tentative connection module 18 transmits "CallProceeding" to the terminal 32 (S235). Further, the tentative connection module 18 transmits the ARQ to the gate keeper 30 (S237). When the ARQ is received, the gate keeper 30 transmits the ACF to the tentative connection module 18 (S267). When the ACF is received from the gate keeper 30, the tentative connection module 18 transmits Alerting to the terminal 32 (S239). It should be noted that steps S237, S267 and S239 are proceedings from the terminal 6 viewed from the gate keeper 30. Since the such proceedings have been executed between the terminals 6 and 31, and the same proceedings will be executed during the same communication. Therefore, the procedure may be modified such that the steps S327, S267 and S239 with respect to the terminal 32 are omitted.

The interruption control module 15 requests the interruption notification module 16 for notification (see S119 of FIG. 4), and in response to the request, the interruption notification module 16 notifies the terminal 6 of the interruption communication request (S241, FIG. 6). The terminal 6, when receives the notification from the interruption notification module 16, notifies the router 10 of the admission (S211). The interruption control module 15, when detecting the admission by the terminal 6 through the interruption notification module 16 (see S121 of FIG. 6), requests the tentative connection module 18 to execute Connect and channel opening according to H.245 with respect to the terminal 32 (see S123 of FIG. 4). When the request from the interruption control module 15 is received, the tentative connection module 18 transmits Connect to the terminal 32 (S243). Then, the tentative connection module 18, which receives the Connect, executes channel opening according to H.245 with respect to the terminal 32 (S245, S327)

When the channel opening according to H.245 is finished between the tentative connection module 18 and the terminal 32, the interruption control module 15 request the NAT module 13 to transfer the packet which is transmitted from the terminal 6 to the terminal 31 to the terminal 32, transfer the packet transmitted from the terminal 31 to the terminal 6 to the holding module 19, and transfer the packet transmitted from the terminal 32 to the tentative connection module 18 to the terminal 6 (see S127OS131 of FIG. 4). With the above proceedings, the terminal 31 is set to the holding state with respect to the holding module 19 (S247, S295), and allows the connection between the terminals 6 and 32 (S213, S249, and S329).

Thereafter, when the terminal 32 executes the end proceeding according to H. 245, the interruption control module 15 requests the NAT module 13 to transmits the packet transmitted from the terminal 32 to the tentative connection module 18 to the tentative connection module 18 (see S135 of FIG. 5) but not to the terminal 6. In this case, between the tentative connection module 18 and the terminal 32, the end proceeding according to H.245 is executed (S251, S331). When the end proceeding according to H.245 is finished, the terminal 32 transmits "ReleaseComplete" to the tentative connection module 18 in order to notify the release of the connection with respect to the tentative connection module 18 (S333). Thereafter, the terminal 32 transmits DRQ to the gate keeper 30 (S335). When the DRQ transmitted by the terminal 32 is received, the gate keeper 30 transmits DCF to the terminal 32 (S269). When "ReleaseComplete" transmitted by the terminal 32 is received, the tentative connection module 18 transmits the DRQ to the gate keeper 30 (S253). When the DRQ is received from the tentative connection module 18, the gate keeper 30 transmits DCF to the tentative connection module 18 (S271).

The interruption control module 15 requests the NAT module 13 to stop transferring the packet transmitted from the terminal 31 to the terminal 6 to the tentative connection module 18, and to stop transferring the packet transmitted from the terminal 6 to the terminal 31 to the terminal 32 (see S143 of FIG. 5), thereby connection between the terminals 6 and 31 is recovered (S215, S297). Thereafter, when the communication between the terminals 6 and 31 is finished, the end proceeding according to H.245 is executed between the terminals 6 and 31 (S217, S299). When the end proceeding according to H.245 is finished between the terminals 6 and 31, the terminal 6 transmits "ReleaseComplete" to the terminal 31 to notify the release of the connection between the terminals 6 and 31 (S219). Thereafter, the terminal 6 transmits DRQ to the gate keeper 30 (S221). When the DRQ is received from the terminal 6, the gate keeper 30 transmits DCF to the terminal 6 (S273). When "ReleaseComplete" is received, the terminal 31 transmits DRQ to the gate keeper 30 (S301). When the DRQ transmitted from the terminal 31 is received, the gate keeper 30 transmits DCF to the terminal 31 (S275).

When the terminal 32 execute the end proceeding of a call while the terminals 6 and 32 are communicating (S213, S249, S329 of FIG. 9), as steps S297 onwards, the end proceeding according to H.245 is executed. When the terminal 32 performs the TCP communication (i.e., the communication other than the voice communication), the end proceeding according to the TCP is executed.

In the above-described embodiment, the session information and "AuType" are stored in the storage module 14. Therefore, even when the terminals 6 and 31 are communicating, by referring to the session information and "AuType" stored in the storage module 14, a connection with the terminal 6 or 31 can be initiated. That is, a so-called call-waiting telephone function can be implemented in the IP telephone system.

By use of the session information and "AuType" stored in the storage module 14, the channel opening according to H.245 between the terminal 32 and the tentative connection module 18 can be completed. Therefore, only by a relatively simple process, i.e., by changing the destination of the packet, the communication with the terminal 6 and the terminal 32 is enabled.

When the communication between the terminals 6 and 32 is completed, the end proceeding is executed between the terminal 32 and the tentative connection module 18. Therefore, the terminal 6 is not required to execute the end proceeding, and connection between the terminals 6 and 31 can be recovered immediately.

Since the NAT module 13 changes the IP addresses and ports written in the payload of the packet as well as those written in the header, even if the receiving terminal employs a communication protocol according to H.323 and refers to the IP addresses and/or ports in the payload, the communication can be performed without any problem.

While the terminals 6 and 32 are communicating, the connection between the tentative connection module and the terminal 31 is held. Therefore, when the terminal 32 completed the communication, the connection between the terminals 6 and 31 can be recovered immediately.

When the connection with the terminal 31 is held by the holding module 19, the holding module 19 may transmits audio information to the terminal 31. With such a configuration, the user of the terminal 31 can be notified that the line is being held.

With the interruption notification module 16, the interruption communication between the terminals 6 and 32 can be executed after the admission of the user of the terminal 6.

Further, the interruption notification module 16 notifies the communication request from the terminal 32 by means of the packet communication. Therefore, even if the terminal 6 and the router 10 are distant from each other, the communication request from the terminal 32 can be notified without fail.

Further to the above, since the interruption notification module 16 notifies the communication request from the terminal 32 by turning on the LED of the user interface module 17, the communication request from the terminal 32 can be notified without interrupting the communication between the terminals 6 and 31.

Since the interruption notification module 16 detects the admission at the terminal 6 by means of the packet communication, even if the terminal 6 and the router 10 are distant from each other, the admission at the terminal 6 can be detected without fail.

Since the interruption notification module.16 detects the admission at the terminal 6 when the user of the terminal 6 operates a switch of the user interface module 17, it is ensured that the admission at the terminal 6 can be detected correctly.

Since the NAT module 13 is adopted to convert the IP addresses and ports., a communication between the terminals respectively connected to networks having different addressing systems is enabled.

According to the embodiment described above, the call-waiting function can be implemented in the IP telephone systems which are employed in various network systems using the IP, such as the Internet.

Further, among applications employing H.323, the call-waiting communication can be realized.

In the foregoing, an exemplary embodiment is described. It should be noted that the invention need not be limited to the configuration described above, and can be modified in various ways without departing from the scope of the invention.

For example, in the above-described embodiment, the IP telephone systems for the voice communication is described. However, apparatuses which communicate according to the IP and transmit/receive various data such as image data as well as voice or audio data may employ the present invention.

The above-described embodiment is configured such that the call-waiting function is realized between the EP 1 and EP 3 according to H.323 when the EP 1 and EP 2 communicate according to H.323. This is an exemplary configuration, and as far as the communication according to H.323 is allowed with reference to the session information and terminal capability as stored, different configuration is possible. For example, when the EP 1 and EP 2 communicate according to H.323, the EP 2 and an EP 4 which is connected to a LAN 3 may be allowed to communicate according to H.323.

In the embodiment, after the EP 3 terminate the communication with the EP 1, the EP 3 performs the end proceeding with the tentative connection module 18. The invention need not be limited to such a configuration, and, in the above case, the system may be configured such that the end proceeding may be performed between the EP 3 and the EP 1. In this case, when the connection between the EP 1 and EP 2 is to be recovered, the EP 1 may execute the channel opening according to H.245.

According to the embodiment, only when the EP 1 and EP 3 executes the communication according to H.323, the EP 2 communicates with the holding module 19. The present invention need not be limited to this configuration, and the holding module 19 may be omitted. In such a case, the system may be configured such that, when the EP 1 and EP 3 communicates according to H.323, the packet transmitted from the EP 2 will not be processed.

Additionally, according to the embodiment, the holding module 19 transmits audio information indicative of the holding condition to the EP 2. However, the configuration may be modified such that information other than the audio information may be transmitted or no data may be transmitted.

In the embodiment, the interruption notification module 16 is provided, which notifies the user of the EP 1 of the communication request from the EP 3, and detects admission of the user of the EP 1. The invention need not be limited to such a configuration, and may be configured such that the interruption notification module 16 is omitted and the communication between the EP 1 and the EP 3 is forcibly started in response to the communication request from the EP 3.

According to the embodiment, the interruption notification module 16 notifies of the communication request from the EP 3 by transmitting a packet to the EP 1. If the notification can be made with another method, the transmission of the packet may be omitted.

The interruption notification module 16 notifies of the communication request from the EP 3 by turning on the LED of the user interface 17. If alternative notification method is available, a configuration without the LED may be used.

Further, in the embodiment, the interruption notification module 16 detects the admission information contained in the packet transmitted from the EP 1. If alternative method for detecting the admission is available, the configuration for detecting the admission contained in the packet can be omitted.

The interruption notification module 16 is configured to detects the admission in accordance with the output of the user-operable switch provided to the user interface 17. If an alternative method for detecting the admission, the switch can be omitted.

According to the embodiment, the router 10 includes all the functions enabling the call-waiting function. However, the invention is not limited to such a configuration, and any other device connected to the LAN 3 can be implemented with at least a part of such functions.

According to the embodiment, the network 2 and the LAN 3 are configured such that data packets are transmitted according to IP. However, the invention need not be limited to this particular configuration, and at least one of the network 1 and the LAN 3 may be configured such that data packet are transmitted according to another protocol.

In the network system 1, as a communication protocol (VoIP) for executing voice communication among the terminals, H.323 is employed. It should be noted that the invention need not be limited to such a configuration, and another protocol such as SIP may be employed. Incidentally, when the SIP is employed, the terminal capability stored in the storage module 14 is information described according to RFC2327 as shown in FIG. 15, which is informed by INVITE.

Further, the NAT module 13 converts the IP addresses and ports included in the header and payload, according to the embodiment. However, as far as the communication can be established in accordance with the user protocol, the NAT module 13 may be configured to convert only the IP addresses and ports included in the header of the packet.

The NAT module 13 is configured to convert the sending and receiving IP addresses and ports in response to the request of the interruption control module 15. However, as far as the communication can be established, the NAT module 13 may be configured to converts part of the sending and receiving IP addresses and ports included on the packet.

According to the embodiment, the EP 1 through EP 3 are all IP telephones. However, the invention need not be limited to such a configuration and at least one of the EP 1 through EP 3 may be another terminal having a function of the IP telephone.

In the above-described embodiment, firstly the terminals 6 and 31 communicate with each other. Then, the terminal 32 interrupts to communicate with the terminal 6. Then, the connection between the terminals 6 and 31 is held, and the communication between the terminal 6 and 32 is initiated. After the connection between the terminals 6 and 32 is finished, the connection between 6 and 31 is recovered.

In some cases, the user of the terminal 6 may wish to switch the terminals 31 and 32 by a plurality of times. For example, after the communication between terminals 6 and 32 has initiated with the terminal 31 being held, the user of the terminal 6 may intend to communicate with the terminal 31 for a short period, and then with the terminal 32 again. Second and third embodiments described below will provide such a function.

For the sake of explanation, in the second and third embodiments, a term "hooking" operation will be used as an operation to switch the destination of the communication between the EP 2 and EP 3.

Second Embodiment

In the second embodiment described hereinafter, when the EP 1 (i.e., terminal 6) and the EP 2 (terminal 32) are communicating with each other and the EP 3 is being held, or when the EP 1 and EP 3 are communicating and the EP 2 is being held, in response to every predetermined operation at the EP 1, the destination terminal is switched from the EP 2 to EP 3 and at the same time the terminal to be in the holding status is switched from the EP 3 to EP 2, or the destination terminal is switched from the EP 3 to EP 2 and at the same time the terminal to be in the holding status is switched from the EP 2 to EP 3. It should be noted that the predetermined operation indicated above includes a first predetermined operation and a second predetermined operation, which will be described hereinafter.

<First Hooking Operation>

Figure 17A:
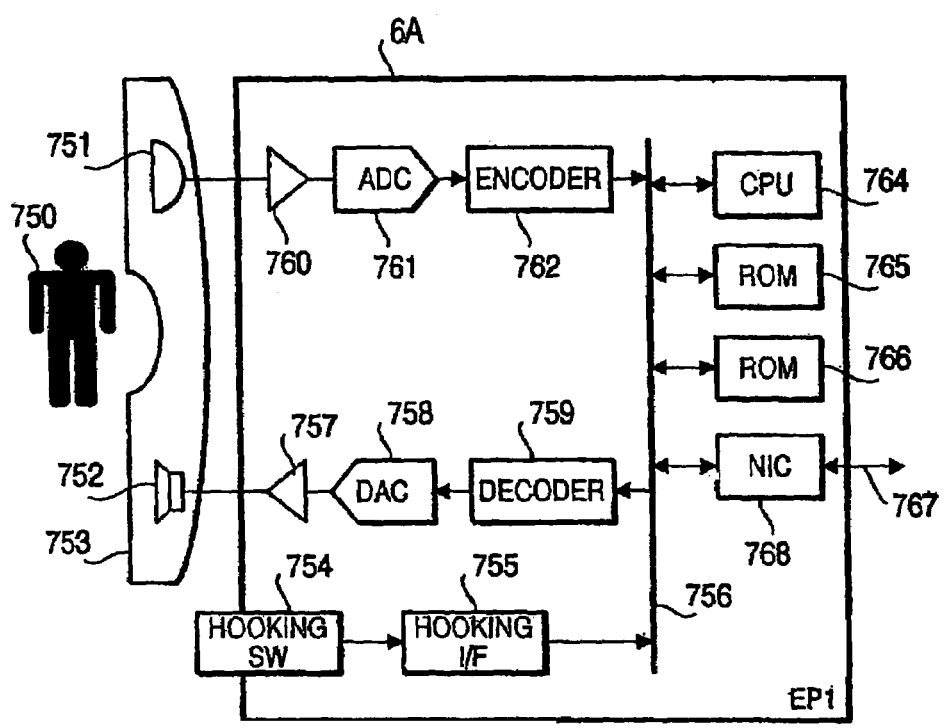
FIG. 17A shows a configuration of the terminal according to the second embodiment.
Figure 17B:
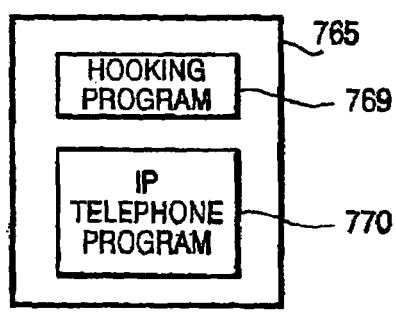
FIG. 17B shows a configuration of the RAM of the terminal according to the second embodiment.

The entire network system according to the second embodiment is similar to that of the first embodiment as shown in FIG. 1. FIG. 17A shows a configuration of the terminal 6A (corresponding to terminal 6 of the first embodiment) according to the second embodiment. The terminal 6A includes a handset 753 provided with a microphone 751 and a speaker 753. The microphone 751 is connected with a microphone amplifier 760 which amplifies the output of the microphone 751. The amplified audio signal output by the microphone amplifier 760 is converted to a digital audio signal by a A/D (analog-to-digital) converter 761, and the digital audio signal output by the A/D converter 761 is encoded by the encoder 762. The output of the encoder 762 is applied to a bus 756. The terminal 7A further includes, as shown in FIG. 17A, a CPU 764, a ROM 765, a RAM 766 and an NIC 768, which are interconnected through the bus 756. The CPU 764 controls the entire operation of the terminal 6A. The ROM 765 stores programs to be executed by the CPU 764. In particular, the ROM 765 stores, as shown in FIG. 17B, a hooking program 769 and an IP telephone program 770. The RAM 766 provides a work area for the CPU 764 and temporarily stores various parameters. The NIC 768 enables the terminal 6A to be connected with a LAN 767. In the following description, terminal 6A (6), terminals 31 and 32 will be occasionally referred to as the EP 1, EP 2 and EP 3, respectively.

When the EP 1 and EP 2 are communicating, according to the call-waiting function similar to the first embodiment, the EP 3 can be connected to the EP 1, while the EP 2 is held. At this stage, when a user 750 of the EP 1 (terminal 6) depresses the hooking switch 754, a hooking interface 755 generates a one-shot electrical pulse, which is transmitted to the CPU 764 through the bus 756. In the embodiment, the one-shot electrical pulse signal is a rectangular signal of which the signal level (i.e., amplitude) changes from L (=0V) to H (=5V), and then from H to L. At one depression of the hooking switch 754, one electrical pulse is transmitted to the CPU 764. It should be noted that, the hooking switch 754 and the hooking I/F 755 are configured such that, even if the hooking switch is held depressed for a relatively long period, only one pulse having a predetermined width is output by the hooking I/F 755.

Figure 18:
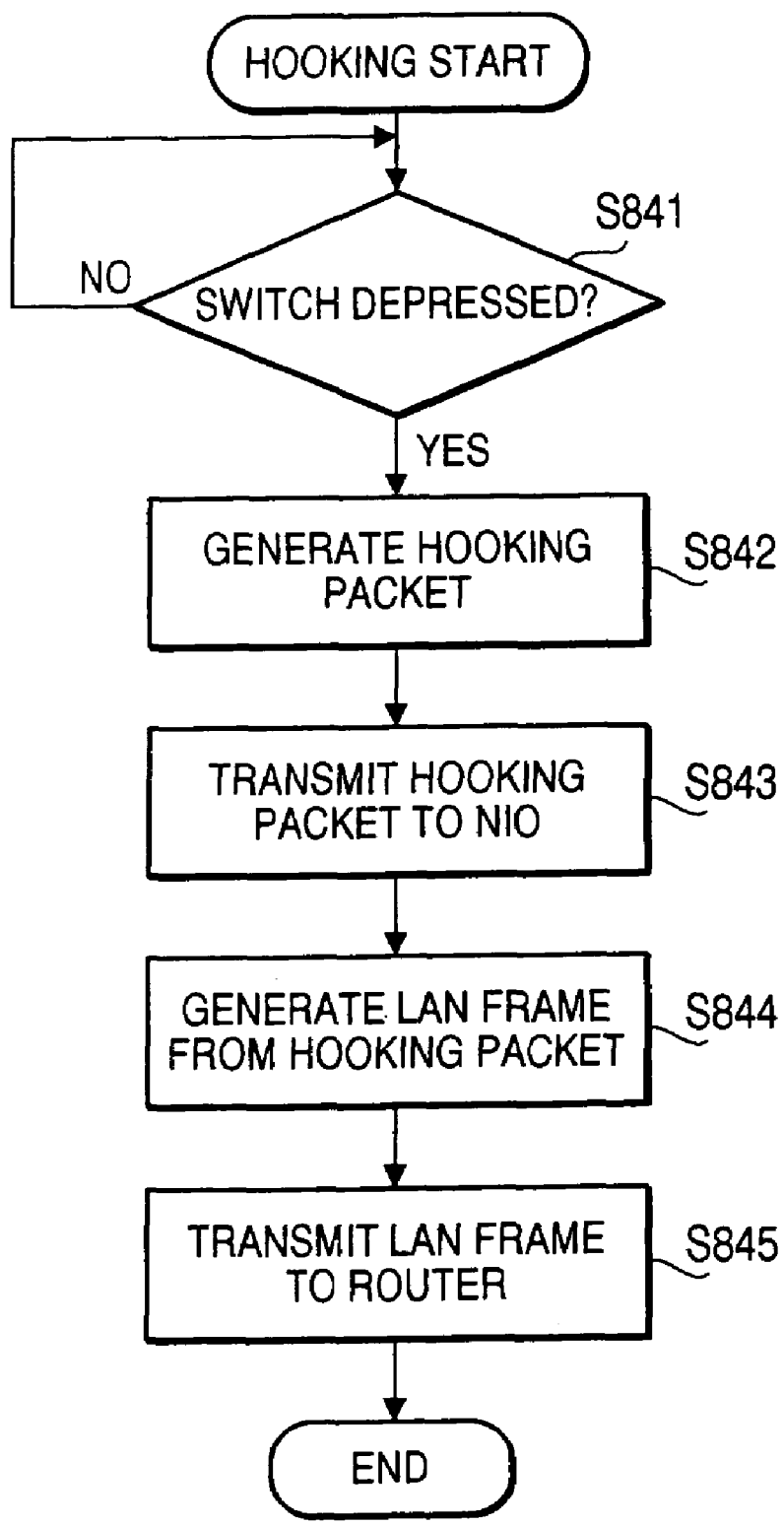
FIG. 18 is a flowchart illustrating the hooking operation according to the second embodiment.

FIG. 18 is a flowchart illustrating the hooking operation executed by the EP 1. Process determines in S841 whether the user 750 has depressed the hooking switch 754. When no pulse signal (output by the hooking I/F 755) is detected (S841: NO), process repeats S841 until the depression of the hooking switch 754 is detected. When process detects the depression of the hooking switch 754 (S841: YES), that is, when the CPU 754 receives the hooking request from the user 750, the hooking program 769 is retrieved from the ROM 765 and developed in the RAM 766 for executing proceedings from S842.

Figure 19:
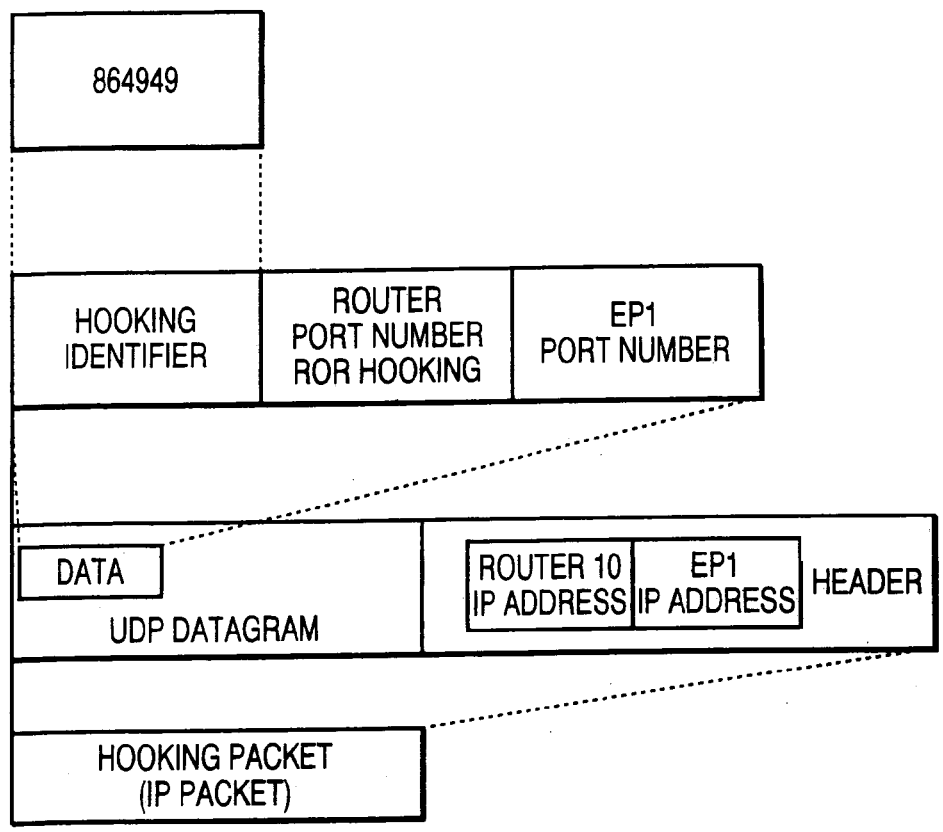
FIG. 19 shows a structure of a hooking packet.

In S842, process generates a hooking packet (see FIG. 19). FIG. 19 shows a data structure of the hooking packet. The hooking packet is an IP packet including a UDP datagram and a header. The UDP datagram includes, as shown in the drawing, a hooking identifier, a router port number for hooking, and an EP 1 port number. In the example shown in FIG. 19, the hooking identifier is a number "864949". The CPU 764 transfer the hooking packet to the NIC 768 via the bus 756 (S843). Then, the NIC 768 incorporate the received packet in a LAN frame data (not shown) in S844, and transmits the LAN frame data to the IP address of the router 10 at the port (UDP49512) for hooking (S845).

Figure 20:
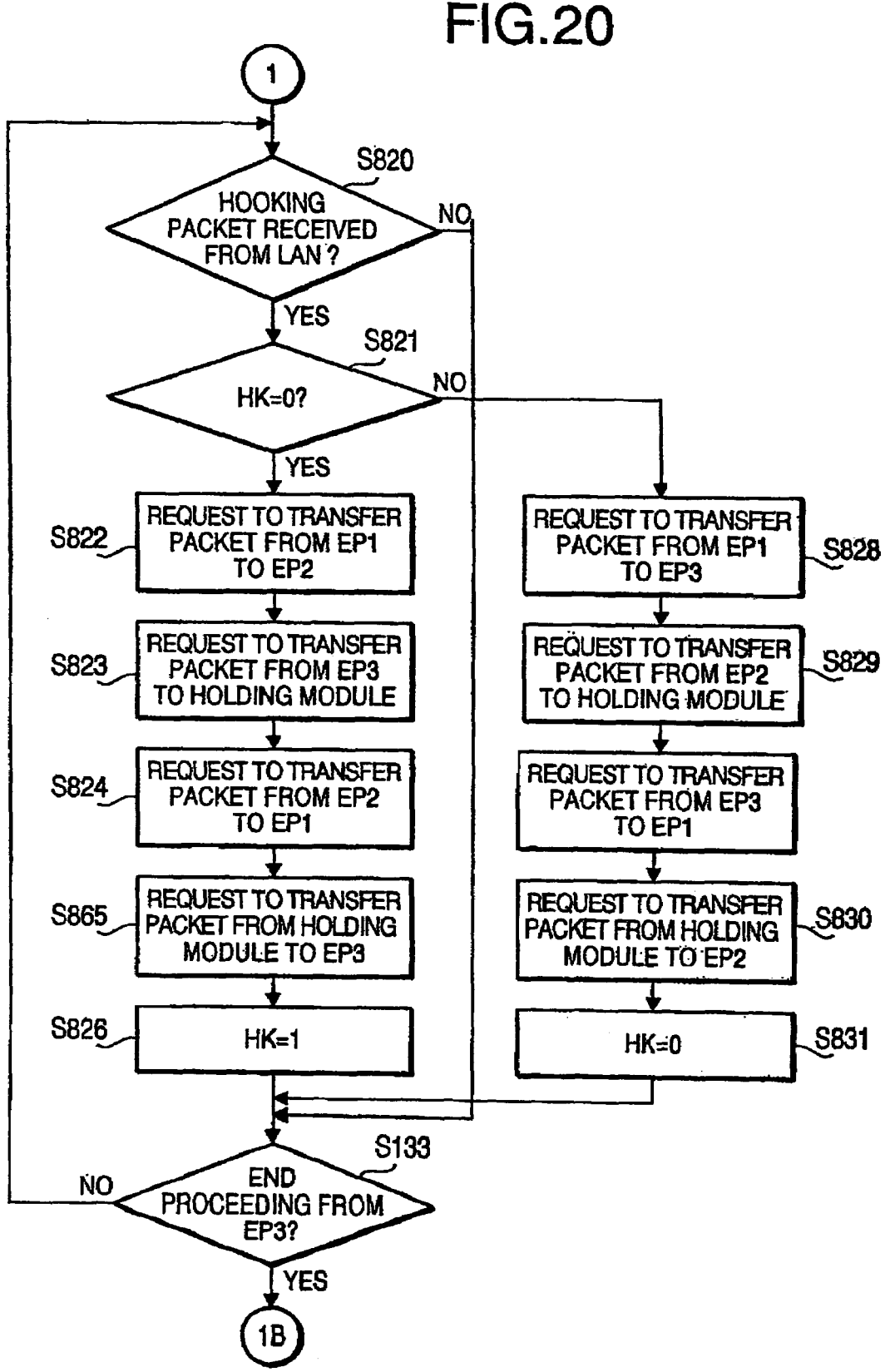
FIG. 20 shows a part of interruption control procedure according to the second embodiment.

FIG. 20 shows a part of interruption control procedure according to the second embodiment. When the interruption control procedure according to the second embodiment is started, S101-S131 as shown in FIG. 4 are executed. After S131, process proceeds to S820 shown in FIG. 20.

In S820, process determines whether the router 10 (LAN side I/F 25) has received the hooking packet. Specifically, when the router receives the LAN frame data through the LAN 767, the IP packet is extracted. When the used port number is UDP49152 and the UDP datagram includes the hooking identifier 864949 is detected, process determines that the hooking packet is received (S820: YES). When the hooking packet is not received (S820: NO), process proceeds to S133, and if the end proceeding is executed with respect to the EP 3 (S133: YES), process proceeds to S135 shown in FIG. 5. Thus, in this case (i.e., no hooking packet is received), proceedings after S131 of FIG. 4 are the same.

When the hooking packet is received (S820: YES), process determines whether a value of the HK register is equal to zero (S821). The HK register is for indicating the status of hooking, and provided in the RAM 23. Immediately after the communication between the EP 1 and EP 2 started, the value of the HK register equals to zero. When the call-waiting function is effected, the EP 1 is connected with the EP 3, and the EP 2 is connected with the holding module 18.

When the CPU 21 detects the hooking identifier, process modifies the correspondence table of the NAT as follows:

the destination of the packet transmitted from the EP 1 is changed such that the IP address and port number of EP 3 are changed to the IP address and port number of the EP 2;

the destination of the packet transmitted from the EP 3 is changed such that the IP address and port number of the EP 1 are changed to the IP address and port number of the holding module 19;

the destination of the packet transmitted from the EP 2 is changed such that the IP address and port number of the holding module 19 are changed to the IP address and port of the EP 1; and the destination of the packet transmitted from the holding module 19 is changed such that the IP address and port number of the EP 2 are changed to the IP address and the port number of the EP 3 (S822-S825). As the hooking is executed, the value of the register HK is changed from zero to one (S826).

With the above proceedings, the EP 1 communicates with the EP 2, and the EP 3 is connected with the holding module 18 and held.

In order to return the connection status to a status before the above-described hooking is executed, in other words, in order to re-connects the EP 1 to EP 3 and hold (not disconnect) the EP 2, the user of the EP 1 only to depress the hooking switch 754 again. As understood from FIG. 18, when the hooking switch 754 is depressed again, another hooking packet is generated and transmitted to the router 10.

Then, in FIG. 20, process determines that the hooking packet has been received (S820: YES). Since the value of HK has been set to one, process proceeds to S828.

Then, process modifies the correspondence table of the NAT as follows:

the destination of the packet transmitted from the EP 1 is changed such that the IP address and port number of EP 2 are changed to the IP address and port number of the EP 3;

the destination of the packet transmitted from the EP 2 is changed such that the IP address and port number of the EP 1 are changed to the IP address and port number of the holding module 19;

the destination of the packet transmitted from the EP 3 is changed such that the IP address and port number of the holding module 19 are changed to the IP address and port of the EP 1; and the destination of the packet transmitted from the holding module 19 is changed such that the IP address and port number of the EP 3 are changed to the IP address and the port number of the EP 2 (S828-S830). As the hooking is executed, the value of the register HK is changed from one to zero (S831).

With the above proceedings, the EP 1 communicates with the EP 3, and the EP 2 is connected with the holding module 18 and held.

As above, by depressing the hooking switch 754 of the EP 1, the EP 1 is connected to the EP 2 and EP 3, alternately.

When the end procedure at the EP 3 is detected (S133: YES), process proceeds to S135 of FIG. 5.

FIG. 21 shows a part of an operational sequence of the network system according to the second embodiment. FIG. 21 should be inserted between FIGS. 9 and 10: terminals 6-10 of FIG. 9 should be connected to those of FIG. 21; and terminals 6'-10' of FIG. 21 should be connected to terminals 6-10 of FIG. 10, according to the second embodiment.

When the call-waiting communication is started, the terminals 6 and 32 are connected. Thereafter, when the hooking request is made by the user 750 of the terminal 6 (EP 1), a hooking packet is transmitted from the terminal 6 to the router 10 (S900).

When the router 10 receives the hooking packet (S901), the terminal 32 is held (S247B, S295B), and the terminal 31, which was previously held, is connected to the terminal 6 (S213B, S249B, S329B).

If the hooking request is issued by the user 750 of the terminal 6, another hooking packet is transmitted to the router 10 (S900B). Then, the router 10 receives the hooking packet (S901B), and holds the terminal 31 (S247C, S295C) and the terminal 32, which was previously held, is connected to the terminal 6 (S213C, S249C, S329C).

The above-described switching of connection status is executed in response to each operation of the hooking switch.

Third Embodiment

Figure 22A:
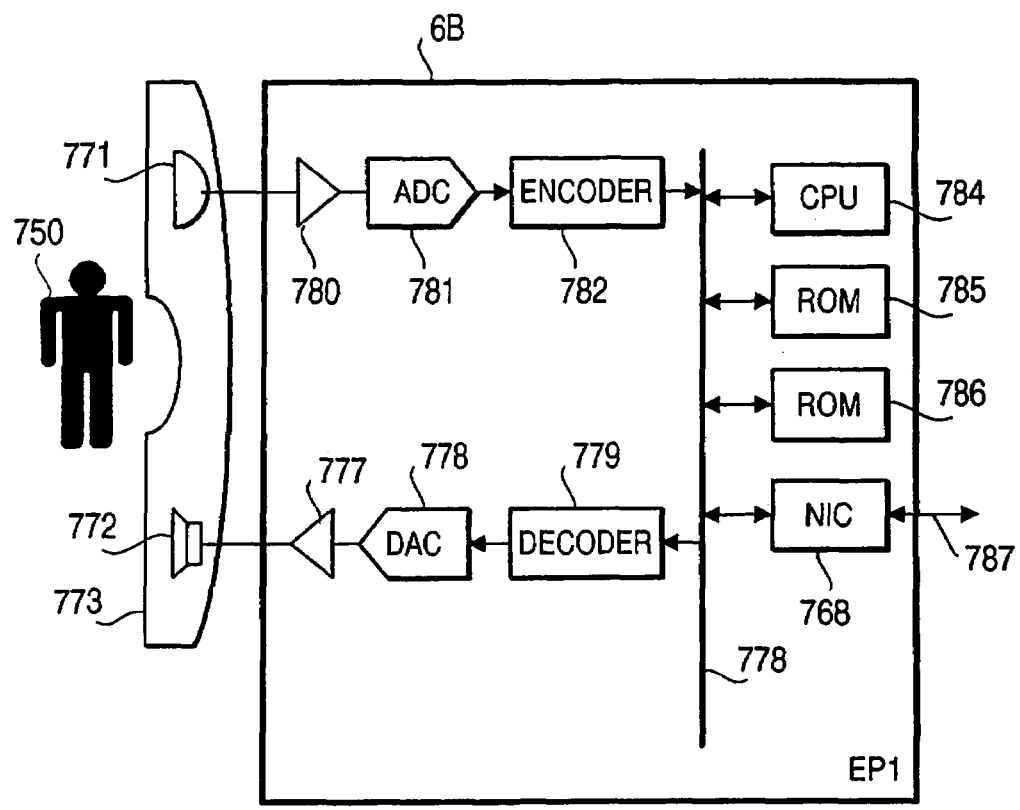
FIG. 22A shows a configuration of the terminal according to a third embodiment.
Figure 22B:
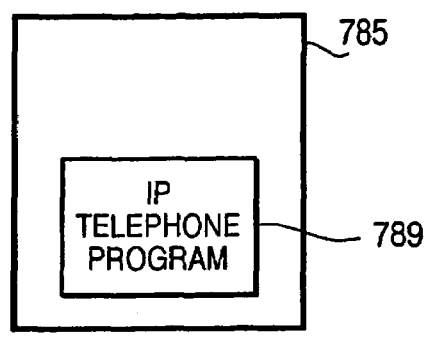
FIG. 22B shows a configuration of the RAM of the terminal according to the third embodiment.

The entire network system according to a third embodiment is similar to that of the first embodiment as shown in FIG. 1. FIG. 22A shows a configuration of the terminal 6B (corresponding to terminal 6 of the first embodiment) according to the third embodiment. FIG. 22B shows the configuration of the ROM 765 according to the third embodiment. It is known by comparing FIGS. 22A and 22B with FIGS. 17A and 17B, according to the third embodiment, the terminal 6B does not include the hooking switch 754 nor the hooking I/F 755. Further, the ROM 765 does not store the hooking program. With this configuration, it is impossible to switch the destination terminals at the EP 1. According to the third embodiment, the switching of the terminals between the EP 2 and EP 3 is performed at the router.

FIG. 23 shows a functional configuration of a router 10B according to the third embodiment. It is understood by comparing FIG. 2B with FIG. 23 that the router 10B is provided with an additional switch (SW2) 17c, which is used for a hooking operation according to the third embodiment.

<Second Hooking Operation>

When the EP 1 and EP 2 are communicating, according to the call-waiting function similar to the first embodiment, the EP 3 can be connected to the EP 1, while the EP 2 is held. At this stage, if a hooking switch (SW2) 17c provided to the switch device 28 of the router 10 is depressed, the user I/F module 17 detects that the switch 17c is depressed.

When the router 10 does not operate to enable the call-waiting function, the interruption notification unit 16 does not notify the call-waiting function request to the interruption control module 15.

The above procedure is performed as the CPU 21 executes programs stored in the ROM 22.

Figure 24:
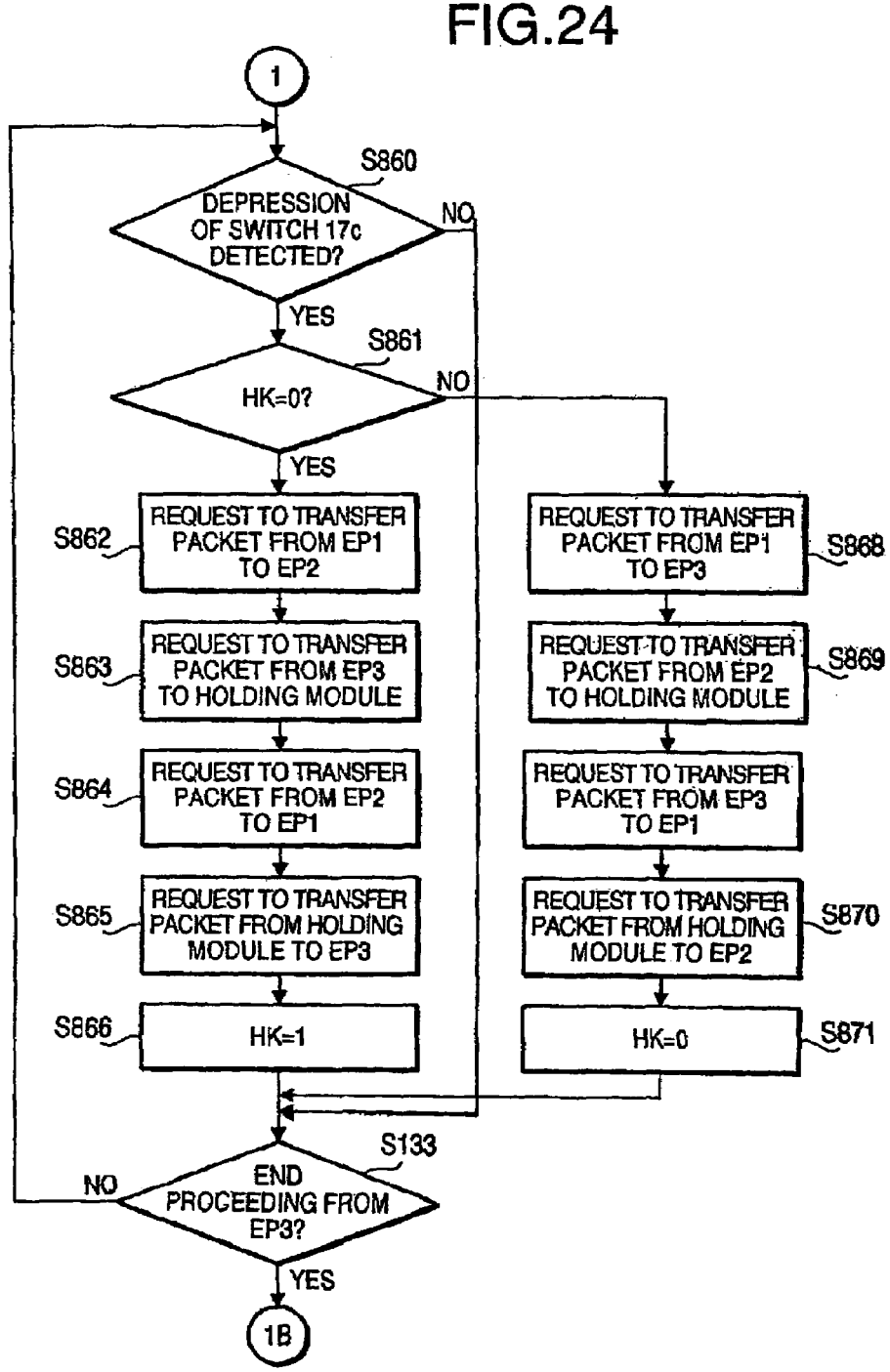
FIG. 24 shows a part of interruption control procedure according to the third embodiment.

FIG. 24 shows a part of interruption control procedure according to the third embodiment. When the interruption control procedure according to the third embodiment is started, S101-S131 as shown in FIG. 4 are executed. After S131, process proceeds to S860 shown in FIG. 24.

In S860, process determines whether the switch 17c of the router 10 has been depressed. When it is determined that the switch 17c has been depressed, process proceeds to S861. When the switch 17c has not been operated (S860: NO), process proceeds to S133, and if the end proceeding is executed at the EP 3 (S133: YES), process proceeds back to S135 shown in FIG. 5. Thus, in this case (i.e., the switch 17c has not been operated), proceedings after S131 are the same as in the first embodiment shown in FIG. 4.

When the switch 17c has been depressed (S860: YES), process determines whether a value of the HK register is equal to zero (S861). The HK register is for indicating the status of hooking, and provided in the RAM 23. Immediately after the communication between the EP 1 and EP 2 started, the value of the HK register equals to zero. When the call-waiting function is effected, the EP 1 is connected with the EP 3, and the EP 2 is connected with the holding module 18.

Steps S862-S866 and S867-S871 are similar to steps S822-S826 and S828-S831 shown in FIG. 20, and therefore, description thereof is omitted.

With the above configuration, by depressing the hooking switch (SW2) 17c of the router 10 when the call-waiting communication is being performed, the EP 1 is alternately connected to the EP 2 and EP 3. When the EP 3 is operated to finish the communication (S133), process proceeds to S135 of FIG. 5.

Although not shown, according to the third embodiment, the switching of the connection status of EP 2 and EP 3 in response to the operation of the hooking switch 17c similar to that shown in FIG. 21 is performed.

In the foregoing description, the second embodiment and the third embodiment are described as separate embodiments. It should be noted that both the terminal(s) and router may be provided with the hooking switch and can switch the connection status.

The present disclosure relates to the subject matter contained in Japanese Patent Application No. 2003-194155, filed on Jul. 9, 2003, which is expressly incorporated herein by reference in its entirety.

What is claimed is:

1. A packet transmission control device, comprising:
   a socket detecting system that detects addresses and ports of a first device and a second device, which perform a packet communication in a network by transmitting/receiving data packets;
   a socket storing system that stores addresses and ports detected by the socket detecting system;
   a session information detecting system that detects session information regarding the packet communication according to a communication protocol of the packet communication between the first device and the second device;
   a session information storing system that stores the session information detected by the session information detecting system;
   a terminal capability detecting system that detects terminal capability of each of the first device and the second device prior to the packet communication according to the communication protocol;
   a terminal capability storing system that stores the terminal capabilities detected by the terminal capability detecting system;
   a tentative connection system that executes a connecting proceeding with a third device when the first device and the second device is executing the packet communication according to the communication protocol, the connecting proceeding with the third device being performed according to the communication protocol, the session information stored in the session information storing system and the terminal capabilities stored in the terminal capability storing system; and
   an interruption system that realize a communication between the first device and the third device by transferring a packet, which is transmitted by the third device toward the tentative connection system, to the first device, and a packet, which is transmitted by the first device toward the second device, to the third device, in accordance with the addresses and ports stored in the socket storing system.

2. The packet transmission control device according to claim 1, wherein the tentative connection system executes an end proceeding of the communication when the communication between the first device and the third device is to be terminated.

3. The packet transmission control device according to claim 1, wherein the interruption system converts the addresses and ports of a destination, which are included in the packet transmitted from the first device toward the second device into addresses and ports for the third device, and addresses and ports of a destination, which are included in the packet transmitted from the third device toward the tentative connection system to the addresses and ports for the first device.

4. The packet transmission control device according to claim 3, wherein the packet includes a header section and an information section, the interruption system converting the addresses and ports included in both the header section and information section.

5. The packet transmission control device according to claim 1, further including a holding system that applies a terminating proceeding to a packet which is transmitted by the second device toward the first device without transmitting to the first device, the holding system stopping the terminating proceeding so that transmission of packets from the second device to the first device is re-executed when the communication between the first device and the third device is terminated.

6. The packet transmission control device according to claim 5, wherein the holding system is configured to transmit packets containing predetermined information to the second device when the terminating proceeding is applied to the packet transmitted by the second device.

7. The packet transmission control device according to claim 5, wherein, when a predetermined operation is executed, the holding system stops the terminating proceeding applied to the packets transmitted by the second device, the holding system applying the terminating proceeding to packets which are transmitted by the third device toward the first device without transmitting to the first device, the holding system stopping the terminating proceeding so that transmission of packets from the second device to the first device is re-executed when the communication between the first device and the third device is terminated.

8. The packet transmission control device according to claim 7, wherein the predetermined operation includes an operation of an operable member provided to the first device.

9. The packet transmission control device according to claim 1, further including:
   an interruption detecting system that detects a request of the third device for a communication with the first device;
   an interruption notifying system that notifies the request for the communication detected by the interruption detecting system; and
   an admission detecting system that detects that a user of the first device accepted the request for the communication transmitted by the interruption notifying system,
   wherein the interruption system realizes the communication between the first device and the second device when the admission detecting system detects that the user of the first device accepted the request for the communication.

10. The packet transmission control device according to claim 9, wherein the interruption notifying system is configured to transmit a packet containing a notification to the first device.

11. The packet transmission control device according to claim 9, wherein the interruption notifying system notifies using a display which is recognizable by the user of the first device.

12. The packet transmission control device according to claim 9, wherein the admission detecting system detects admission information that is included in a packet transmitted by the first device.

13. The packet transmission control device according to claim 9, wherein the admission detecting system detects an output of a user operable switch provided to the first device, the user operable switch being operated by the user when the request for the communication is accepted.

14. The packet transmission control device according to claim 1,
   wherein the first device is connected to one of a plurality of sub-networks which are connected in parallel or hierarchically to form a network, and
   wherein the second device and the third device are connected to another one of the plurality of sub-networks.

15. The packet transmission control device according to claim 14, which is implemented in a router that relays the packet communication between devices connected to one of the plurality of sub-networks and another one of the plurality of sub-networks.

16. The packet transmission control device according to claim 14,
wherein addresses of the first device and the tentative connection device are local addresses in one of the sub-network,
wherein the interruption system includes a converting system that converts the destination addresses and ports included in the packets transmitted by the first device and the tentative connection device into global addresses and ports in the network, and the destination addresses and ports included in the packets transmitted toward the first device and the tentative connection device into local addresses and ports in the one of the sub-networks.

17. The packet transmission control device according to claim 1, wherein the packet is transmitted in accordance with the Internet Protocol.

18. The packet transmission control device according to claim 1,
wherein the communication protocol is one of H.323 and SIP (Session Initiation Protocol), and
wherein the terminal capability is Open Logical Channel when the communication protocol is H.323, and INVITE when the communication protocol is the SIP.

19. The packet transmission control device according to claim 1, wherein each of the first device, second device and the third device has a function of an IP telephone.

20. A method for controlling a packet transmission, comprising:
a socket detecting step that detects addresses and ports of a first device and a second device, which perform a packet communication in a network by transmitting/receiving data packets;
a socket storing step that stores addresses and ports detected in the socket detecting step;
a session information detecting step that detects session information regarding the packet communication according to a communication protocol of the packet communication between the first device and the second device;
a session information storing step that stores the session information detected in the session information detecting step;
a terminal capability detecting step that detects terminal capability of each of the first device and the second device prior to the packet communication according to the communication protocol;
a terminal capability storing step that stores the terminal capabilities detected in the terminal capability detecting step;
a tentative connection step that executes a connecting proceeding between a tentative connection device and a third device when the first device and the second device is executing the packet communication according to the communication protocol, the connecting proceeding with the third device being performed according to the communication protocol, the session information stored in the session information storing step and the terminal capabilities stored in the terminal capability storing step;
an interruption step that realizes a communication between the first device and the third device by transferring a packet, which is transmitted by the third device toward the tentative connection device, to the first device, and a packet, which is transmitted by the first device toward the second device, to the third device, in accordance with the addresses and ports stored in the socket storing step; and
a recovering step that recovers the communication between the first device and the second device by changing back a destination of the packet transmitted from the first device toward the second device to the second device when the communication between the first device and the second device is terminated.

21. A method for controlling a packet transmission, comprising:
a socket detecting step that detects addresses and ports of a first device and a second device, which perform a packet communication in a network by transmitting/receiving data packets;
a socket storing step that stores addresses and ports detected in the socket detecting step;
a session information detecting step that detects session information regarding the packet communication according to a communication protocol of the packet communication between the first device and the second device;
a session information storing step that stores the session information detected in the session information detecting step;
a terminal capability detecting step that detects terminal capability of each of the first device and the second device prior to the packet communication according to the communication protocol;
a terminal capability storing step that stores the terminal capabilities detected in the terminal capability detecting step;
a tentative connection step that executes a connecting proceeding between a tentative connection device and a third device when the first device and the second device is executing the packet communication according to the communication protocol, the connecting proceeding with the third device being performed according to the communication protocol, the session information stored in the session information storing step and the terminal capabilities stored in the terminal capability storing step;
an interruption step that realizes a communication between the first device and the third device by transferring a packet, which is transmitted by the third device toward the tentative connection device, to the first device, and a packet, which is transmitted by the first device toward the second device, to the third device, in accordance with the addresses and ports stored in the socket storing step; and
a recovering step that recovers the communication between the first device and the second device by changing back a destination of the packet transmitted from the first device toward the second device to the second device with holding the communication with the third device by transferring a packet, which is transmitted by the third device toward the first device to the tentative connection device, and by transferring a packet, which is transmitted by the first device toward the tentative connection device, to the second device, in accordance with the addresses and ports stored in the socket storing step.

22. A computer readable medium storing a computer program comprising computer readable instructions that cause a computer to:
detect addresses and ports of a first device and a second device, which perform a packet communication in a network by transmitting/receiving data packets;
store addresses and ports as detected;

detect session information regarding the packet communication according to a communication protocol of the packet communication between the first device and the second device;

store the session information as detected;

detect terminal capability of each of the first device and the second device prior to the packet communication according to the communication protocol;

store the terminal capabilities as detected;

execute a connecting proceeding between a tentative connection device and a third device when the first device and the second device are executing the packet communication according to the communication protocol, the connecting proceeding with the third device being performed according to the communication protocol, the session information as stored and the terminal capabilities as stored; realize a communication between the first device and the third device by transferring a packet, which is transmitted by the third device toward the tentative connection device, to the first device, and a packet, which is transmitted by the first device toward the second device, to the third device, in accordance with the addresses and ports as stored; and recover the communication between the first device and the second device by changing back a destination of the packet transmitted from the first device toward the second device to the second device when the communication between the first device and the second device is terminated.

23. A computer readable medium storing a computer program comprising computer readable instructions that cause a computer to:

detect and store addresses and ports of a first device and a second device, which perform a packet communication in a network by transmitting/receiving data packets;

detect and store session information regarding the packet communication according to a communication protocol of the packet communication between the first device and the second device;

detect and store terminal capability of each of the first device and the second device prior to the packet communication according to the communication protocol;

execute a connecting proceeding between a tentative connection device and a third device when the first device and the second device is executing the packet communication according to the communication protocol, the connecting proceeding with the third device being performed according to the communication protocol, the session information as stored and the terminal capabilities as stored;

realize a communication between the first device and the third device by transferring a packet, which is transmitted by the third device toward the tentative connection device, to the first device, and a packet, which is transmitted by the first device toward the second device, to the third device, in accordance with the addresses and ports as stored; and recover the communication between the first device and the second device by changing back a destination of the packet transmitted from the first device toward the second device to the second device with holding the communication with the third device by transferring a packet, which is transmitted by the third device toward the first device to the tentative connection device, and by transferring a packet, which is transmitted by the first device toward the tentative connection device, to the second device, in accordance with the addresses and ports as stored.

\* \* \* \* \*